(12) United States Patent
Kobayashi

(10) Patent No.: US 12,455,436 B2
(45) Date of Patent: Oct. 28, 2025

(54) OPTICAL SYSTEM AND IMAGE PICKUP APPARATUS

(71) Applicant: CANON KABUSHIKI KAISHA, Tokyo (JP)

(72) Inventor: Yuma Kobayashi, Tochigi (JP)

(73) Assignee: CANON KABUSHIKI KAISHA, Tokyo (JP)

(*) Notice: Subject to any disclaimer, the term of this patent is extended or adjusted under 35 U.S.C. 154(b) by 413 days.

(21) Appl. No.: 18/155,805

(22) Filed: Jan. 18, 2023

(65) Prior Publication Data

US 2023/0244065 A1    Aug. 3, 2023

(30) Foreign Application Priority Data

Feb. 1, 2022   (JP) .................................. 2022-013869

(51) Int. Cl.
*G02B 13/00* (2006.01)
*G02B 9/12* (2006.01)
*G02B 23/24* (2006.01)

(52) U.S. Cl.
CPC ............. *G02B 13/006* (2013.01); *G02B 9/12* (2013.01); *G02B 23/243* (2013.01)

(58) Field of Classification Search
CPC ....... G02B 13/006; G02B 9/12; G02B 23/243
See application file for complete search history.

(56) References Cited

U.S. PATENT DOCUMENTS

| 7,911,714 | B2* | 3/2011 | Shinohara | ............... G02B 13/18 |
| | | | | 359/772 |
| 9,798,115 | B1 | 10/2017 | Yin et al. | |
| 2010/0134903 | A1* | 6/2010 | Hirao | ................. G02B 13/0025 |
| | | | | 359/738 |
| 2018/0081154 | A1 | 3/2018 | Cheng | |

FOREIGN PATENT DOCUMENTS

| JP | 2009-251210 A | 10/2009 |
| JP | 2009-301046 A | 12/2009 |
| JP | 2011-017764 A | 1/2011 |
| WO | 2012/160983 A1 | 11/2012 |

OTHER PUBLICATIONS

Notice of Reasons for Refusal issued by the Japanese Patent Office on Jun. 4, 2024 in corresponding JP Patent Application No. 2022-013869, with English translation.

* cited by examiner

*Primary Examiner* — George G. King
(74) *Attorney, Agent, or Firm* — Carter, DeLuca & Farrell LLP

(57) ABSTRACT

An optical system consists of, in order from an object side to an image side, a first unit, a second unit, and a third unit. The first unit includes a first substrate, a first lens disposed on the object side of the first substrate, and a second lens having negative power and disposed on the image side of the first substrate. The second unit includes a second substrate and a third lens having positive power and disposed on the object side or the image side of the second substrate. The (Continued)

third unit includes a third substrate and a fourth lens having positive power and disposed on the object side or the image side of the third substrate. A predetermined condition is satisfied.

15 Claims, 13 Drawing Sheets

OPTICAL SYSTEM AND IMAGE PICKUP APPARATUS

BACKGROUND

Technical Field

One of the aspects of the disclosure relates to an optical system and an image pickup apparatus.

Description of the Related Art

A compact optical system with high optical performance has recently been demanded as an optical system for an image pickup apparatus such as a medical endoscope. U.S. Pat. No. 9,798,115 discloses a miniature optical system fabricated by wafer level processing.

U.S. Pat. No. 9,798,115 does not disclose a concrete configuration for achieving both miniaturization and high optical performance of the optical system.

SUMMARY

One of the aspects of the disclosure provides an optical system that is compact and has high optical performance.

An optical system according to one aspect of the disclosure consists of, in order from an object side to an image side, a first unit, a second unit, and a third unit. The first unit includes a first substrate, a first lens disposed on the object side of the first substrate, and a second lens having negative power and disposed on the image side of the first substrate. The second unit includes a second substrate and a third lens having positive power and disposed on the object side or the image side of the second substrate. The third unit includes a third substrate and a fourth lens having positive power and disposed on the object side or the image side of the third substrate.

At least one of the following inequalities are satisfied:

$$-1.000 \leq f \times (1/r9 - 1/r0) \leq 0.700$$

$$-1.000 \leq f \times (1/r7 - 1/r0) \leq 0.600$$

where r0, r7, and r9 are radii of curvature at positions on an optical axis of the first lens, 70% of an effective radius of the first lens, and 90% of the effective radius of the first lens, respectively, and f is a focal length of the optical system. An image pickup apparatus having the above optical system also constitutes another aspect of the disclosure.

Further features of the disclosure will become apparent from the following description of exemplary embodiments with reference to the attached drawings.

DESCRIPTION OF THE EMBODIMENTS

Figure 1:
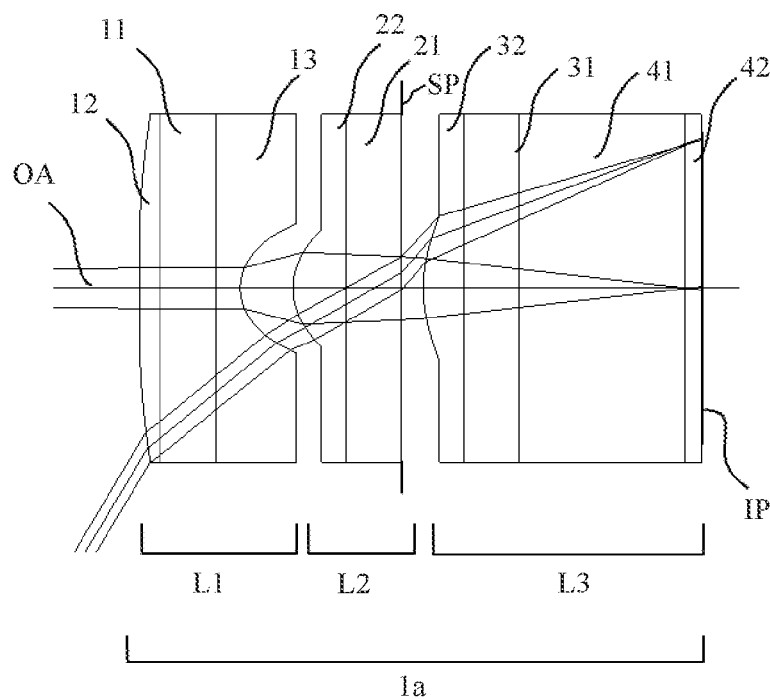
FIG. 1 is a sectional view of an optical system according to Example 1.

Referring now to the accompanying drawings, a detailed description will be given of embodiments according to the disclosure.

An optical system according to each example is a compact optical system using a technology called wafer level optics. Such an optical system is called a wafer level lens, and an image pickup apparatus using the wafer level lens as an imaging optical system is called a wafer level camera. The optical system according to each example is small and less expensive, and thus suitable for an optical system in a built-in camera of an electronic apparatus such as a mobile phone, a smartphone, or a wearable terminal, or as an objective optical system for an endoscope.

FIGS. 1, 3, 5, 7, 9, 11, 13, 15, 17, 19, 21, and 23 are sectional views of the optical systems (wafer level lenses) 1*a*, 1*b*, 1*c*, 1*d*, 1*e*, 1*f*, 1*g*, 1*h*, 1*i*, 1*j*, 1*k*, and 1*l* according to Examples 1 to 12, respectively. In each sectional view, a left side is an object side (front side) and a right side is an image side (rear side). IP denotes an image plane. An imaging plane of a solid-state image sensor such as a CCD sensor or a CMOS sensor in an image pickup apparatus and a photosensitive plane corresponding to a film plane of a film-based camera are placed on the image plane IP.

FIGS. 2, 4, 6, 8, 10, 12, 14, 16, 18, 20, 22, and 24 are aberration diagrams of the optical systems 1*a*, 1*b*, 1*c*, 1*d*, 1*e*, 1*f*, 1*g*, 1*h*, 1*i*, 1*j*, 1*k*, and 1*l* according to Examples 1 to 12, respectively. Each aberration diagram includes, in order from the left, a spherical aberration diagram, an astigmatism diagram, a distortion diagram, and a lateral chromatic aberration diagram. The spherical aberration diagram illustrates spherical aberration amounts for the d-line (having a wavelength 587.6 nm), the g-line (having a wavelength 435.8 nm), the C-line (having a wavelength 656.3 nm), and the F-line (having a wavelength 486.1 nm). In the astigmatism diagram, S denotes an astigmatism amount on a sagittal image plane for the d-line, and M denotes an astigmatism amount on a meridional image plane for the d-line. The distortion diagram illustrates a distortion amount for the d-line. The lateral chromatic aberration diagram illustrates chromatic aberration amounts for the g-line, C-line, and F-line. Fno denotes an F-number (aperture value), and $\omega$ denotes half an angle of view (degrees).

The optical system according to each example consists of, in order from the object side to the image side, a first unit L1, a second unit L2, and a third unit L3. The first unit L1 includes a first substrate 1$l$, a first lens 12 disposed on the object side of the first substrate 1$l$, and a second lens 13 having negative power and disposed on the image side of the first substrate 11. The second unit L2 includes a second substrate 21, a third lens 22 having positive power and disposed on the image side or the object side of the second substrate 21, and an aperture stop SP. The third unit L3 includes a third substrate 31, and a fourth lens 32 disposed on the object side or image side of the third substrate 31. The third substrate 31 can be a back cover glass in some examples.

The optical systems according to Examples 1 to 3 and 7 include a fourth substrate (sensor cover glass) 41 disposed on the image side of the third substrate 31. According to Examples 4 to 6 and 8, the third substrate 31 also functions as a back cover glass and a sensor cover glass.

The first substrate 11 is a flat substrate, and the first lens 12 is a lens with a curved surface facing the object side, which may be a negative lens or a positive lens, and may be flat near the optical axis. In general, an optical element in which both surfaces are flat and parallel is not called a lens. The first lens 12 is flat on or near the optical axis, but has a curvature in the off-axis area and thus refractive power. Therefore, the first lens 12 is called the first lens even if it does not have refractive power on or near the optical axis. The second lens 13 having refractive power is a negative lens (a plano-concave lens near the optical axis) with a concave surface facing the image side. The second lens 13 is formed on the surface on the image side of the first substrate 11 using the wafer level process, and is disposed in close contact with the first substrate 11. Forming the first lens 12 on the object side of the first substrate 11 can improve optical performance without increasing the number of substrates (that is, at low cost). In addition, at the position of the first lens 12, the on-axis light beam and the off-axis light beam are separated from each other in comparison with other lenses. A proper aspherical shape can effectively correct off-axis aberrations. Therefore, this configuration is advantageous to a wide angle of view.

The second substrate 21 is a flat substrate, and the third lens 22 is a positive lens (although it is a plano-convex lens near the optical axis) with a convex surface facing the object side or a positive lens (although it is a plano-convex lens near the optical axis) with a convex surface facing the image side. The third lens 22 is formed on a surface on the object side or the image side of the second substrate 21 using the wafer level process, and is disposed in close contact with the second substrate 21. The third substrate 31 is a flat substrate, and the fourth lens 32 is a positive lens (plano-convex lens) with a convex surface facing the object side or a positive lens (plano-convex lens) with a convex surface facing the image side (plano-convex lens). The fourth lens 32 is formed on a surface on the object side or the image side of the third substrate 31 using a wafer level process, and is disposed in close contact with the third substrate 31. A fourth substrate (sensor cover glass) 41 is provided to protect the image sensor.

In each example, the first unit L1, the second unit L2, and the third unit L3 are manufactured by the wafer level process in order to realize a compact and less expensive optical system. That is, each of the first unit L1, the second unit L2, and the third unit L3 is manufactured by forming a lens layer made of a curable resin material or the like on a wafer (flat substrate) made of a glass material or the like. In the second unit L2, the aperture stop SP is formed on the image side of the second substrate 21 by a similar wafer process. The first unit L1, the second unit L2, the third unit L3 manufactured by the wafer level process, and the image sensor are disposed with a desired distance, and cut after they are bonded at positions outside the effective beam diameters. Thereby a large number of wafer level lenses can be manufactured at once. The effective ray diameter is twice as long as a distance from the farthest position from the optical axis to the optical axis in an area through which an effective imaging light beam can pass on each optical surface. The effective imaging light beam means a light beam excluding stray light and rays that form an image outside an image recording area on the image plane IP. For the surface closest to the object in the optical system according to each example, the effective beam diameter is twice as long as a larger one of a distance between a position where a bottom line of the most off-axis light beam passes through the optical surface and the optical axis, and a distance between a position where a top line of the most off-axis light beam passes through the optical surface and the optical axis.

In each example, the effective ray diameter may be described as an effective diameter, a maximum effective diameter, or the like. The optical surface refers to a lens surface, both surfaces of a flat plate, a cemented surface of them, and the like. A value obtained by dividing the effective ray diameter by 2 is called an effective radius. Using an image sensor slightly smaller than the maximum image height according to each example can make the imaging system resistant to misalignment between the central axes of the image sensor and the optical system that may occur during manufacturing, and to manufacturing errors.

The material forming the lens layer may be a thermoplastic resin, an ultraviolet curable resin, or a thermosetting resin. Examples may include acrylic resins, modified acrylic resins, polycarbonate resins, and modified polycarbonate resins (for example, those containing a fluorene skeleton, Iupizeta manufactured by Mitsubishi Gas Chemical Company, Inc., etc.). Examples may further include epoxy resins, silicone resins, cycloolefin polymers, cycloolefin copolymers, polyvinylcarbazole, polystyrene, polyethylene, Teflon (registered trademark), polyvinylidene fluoride, polysulfones, polyarylates, and polyimides. Examples may further include Teflon AF manufactured by Mitsui Chemours Fluoro Products Co., Ltd., Cytop manufactured by AGC Co., Ltd., perfluoroalkoxyalkane, and the like. Examples may further include a blend of some of them, a copolymer, or a blend of copolymers. Examples may further include materials obtained by adding and/or kneading particles or crystals of low-molecular organic or inorganic materials to these resin materials. Examples may further include a glass material having a sufficiently lower melting point or glass transition point than the substrate material. For example, K-PG325 manufactured by Sumita Optical Glass Co., Ltd. has a low glass transition point of 300° C. or less and is suitable for the optical system according to each example. Glass, quartz, crystals, ceramics, engineering plastics, etc. are suitable as the substrate material in the optical system according to each example.

In each example, each of the first substrate 11, the second substrate 21, and the third substrate 31 is made of glass, and each of the first lens 12, the second lens 13, the third lens 22, and the fourth lens 32 is made of resin or glass, but each example is not limited to these implementations. For example, both the first substrate 11 and the first lens 12 may be made of resin. This point is also applicable to the first substrate 11, the second lens 13, the second unit L2, and the third unit L3.

The aperture stop SP can be formed on the second substrate 21 by vapor-depositing a light shielding film such as chromium using a mask or by forming an opening by etching after vapor deposition. In that case, forming the aperture stop SP on a flat surface such as a substrate facilitates control of the mask arrangement in the thickness direction, which is preferable in terms of manufacturing.

In the optical system according to each example, each substrate does not need to consist of a single substrate, and may include two or more substrates. Especially in a case where the first substrate 11 includes two substrates, the accuracy of the molding surface can be easily improved by molding the first lens 12 and the second lens 13 on different substrates and by bonding the substrates together.

The optical system according to each example is an optical system in which the first unit L1, the second unit L2, and the third unit L3 are integrated. The optical system according to each example and the fourth substrate (sensor cover glass) 41 are cemented (or joined) together to function as an imaging system. According to Examples 1 to 7, the third substrate 31 serves as the back cover glass, and the back cover glass and the sensor cover glass are directly cemented by forming the lens surface of the fourth lens 32 on the object side of the back cover glass. This configuration can provide a compact optical system with high optical performance and reduced material and manufacturing process costs (that is, at low cost). In addition, this configuration can form the lens surface of the fourth lens 32 on the object side of the third substrate 31 by using the third substrate 31 as the sensor cover glass, and the manufacturing process can become less expensive.

Examples 8 and 9 do not need to bond the resin surfaces together, and can easily improve the accuracy of the space between units. Therefore, the cost can be reduced by simplifying the manufacturing process and improving the yield.

Examples 10 to 12 can directly cement (join) the second substrate 21 and the third substrate 31, and can achieve a low-cost, high-precision configuration. As illustrated according to Examples 10 and 12, using only three substrates in addition to the sensor cover glass (i.e., at low cost), a bright, wide-view-angle optical system can be realized. In this configuration, the cemented portion serves as the aperture stop SP, and the aperture stop SP may be formed on the second substrate side or the third substrate side, or a thin sheet having an opening shape may be sandwiched.

In order to protect the lens, the optical system according to each example may include, on the object side of the first lens 12, a flat plate or a protective plate whose both surfaces have approximately the same curvature. The flat plate or protective plate may be set to a wavelength-selective filter to form an optical system that captures only a specific wavelength.

The optical system according to each example satisfies at least one of the following inequalities (1) and (2):

$$-1.000 \leq f \times (1/r9 - 1/r0) \leq 0.700 \tag{1}$$

$$-1.000 \leq f \times (1/r7 - 1/r0) \leq 0.600 \tag{2}$$

where r0, r7, and r9 are radii of curvature at three positions on the optical axis of the first lens 12, 70% of the effective radius of the first lens 12, and 90% of the effective radius of the first lens 12, respectively, and f is a focal length of the optical system (entire system). The off-axis radius of curvature is a radius of a circle that contacts a tangent line of a surface at that point and has its center on the optical axis.

In a case where the value is lower than the lower limit of inequality (1) or (2), the back focus becomes short, the sensor cover glass, the back cover glass, or both must be made extremely thin, and manufacturing becomes difficult. On the other hand, in a case where the value is higher than the upper limit of inequality (1) or (2), the off-axis positive power becomes strong, and the curvature of field cannot be suppressed, and vignetting increases.

Inequalities (1) and (2) may be replaced with inequalities (1a) and (2a), (1b) and (2b), or (1c) and (2c) below, respectively. These configurations can ensure the effects of each example.

$$-0.800 \leq f \times (1/r9 - 1/r0) \leq 0.675 \tag{1a}$$

$$-0.800 \leq f \times (1/r7 - 1/r0) \leq 0.575 \tag{2a}$$

$$0.000 \leq f \times (1/r9 - 1/r0) \leq 0.650 \tag{1b}$$

$$0.000 \leq f \times (1/r7 - 1/r0) \leq 0.560 \tag{2b}$$

$$0.000 \leq f \times (1/r9 - 1/r0) \leq 0.600 \tag{1c}$$

$$0.000 \leq f \times (1/r7 - 1/r0) \leq 0.550 \tag{2c}$$

The optical system according to each example may satisfy the following inequality (3):

$$-30 \leq vd2 - vd1 \leq 70 \tag{3}$$

where vd1 and vd2 are Abbe numbers of the first lens 12 and the second lens 13 based on the d-line, respectively.

The Abbe number vd of a certain material is expressed as follows:

$$vd = (Nd-1)/(NF-NC)$$

where Nd, NF, and NC are refractive indexes based on the d-line (587.6 nm), the F-line (486.1 nm), and the C-line (656.3 nm) in the Fraunhofer line, respectively.

Satisfying inequality (3) can effectively reduce lateral chromatic aberration. In a case where the value is lower than the lower limit of inequality (3), the longitudinal chromatic aberration increases. On the other hand, in a case where the value is higher than the upper limit of inequality (3), the lateral chromatic aberration increases.

Inequality (3) may be replaced with inequality (3a) or (3b) below. These configurations can ensure the effects of each example.

$$-20 \leq vd2 - vd1 \leq 65 \tag{3a}$$

$$-15 \leq vd2 - vd1 \leq 55 \tag{3b}$$

The optical system according to each example may satisfy the following inequality (4):

$$0.00 \leq |f/f1| \leq 0.50 \tag{4}$$

where f1 is a focal length of the first lens 12.

By definition, the value cannot be lower than the lower limit of inequality (4). In a case where the value is higher than the upper limit of inequality (4), the light beam is significantly diffused by the first lens 12 in a case where f/f1<0, it is necessary to increase the outer diameters of another lens and the substrate, and this configuration is disadvantageous to miniaturization. In a case where the value is higher than the upper limit of inequality (4) and f/f1>0, the back focus becomes short, and the sensor cover glass and/or the back cover glass must be made extremely thin, which is disadvantageous to manufacturing. The positive power elements in the entire lens are larger in number and power than the negative power elements, and it becomes difficult to cancel aberrations.

Inequality (4) may be replaced with inequality (4a), (4b), or (4c) below. These configurations can ensure the effects of each example.

$$0.00 \leq |f/f1| \leq 0.40 \tag{4a}$$

$$0.00 \leq |f/f1| \leq 0.35 \tag{4b}$$

$$0.00 \leq |f/f1| \leq 0.29 \tag{4c}$$

The optical system according to each example may satisfy the following inequality (5):

$$-5.50 \leq f4/f2 < -1.00 \tag{5}$$

where f2 is a focal length of the second lens 13, and f4 is a focal length of the fourth lens 32.

Satisfying inequality (5) can correct astigmatism and distortion to proper values.

Inequality (5) may be replaced with inequality (5a), (5b), or (5c) below. These configurations can ensure the effects of each example.

$$-5.30 < f4/f2 < -1.25 \tag{5a}$$

$$-5.25 < f4/f2 < -1.30 \tag{5b}$$

$$-5.10 < f4/f2 < -1.31 \tag{5c}$$

In the optical systems according to Examples 1 to 7, the third lens 22 is disposed on the object side of the second substrate 21 and the fourth lens 32 is disposed on the object side of the third substrate 31. Such optical systems can cancel a variety of aberrations using the first lens 12, the second lens 13, and the third lens 22, which are disposed on the object side of the aperture stop SP, and restrain the aberration generated by the fourth lens 32 on the image side of the aperture stop SP in a well-balanced manner. Thus, the following inequality (6) may be satisfied:

$$0.30 < (f3-f2)/f4 < 1.60 \tag{6}$$

where f3 is a focal length of the third lens 22.

In a case where the value is lower than the lower limit of inequality (6), the power of the fourth lens 32 becomes small, and loses the aberration correcting balance before and after the aperture stop SP. On the other hand, in a case where the value is higher than the upper limit of inequality (6), the power of the fourth lens 32 will increase, it becomes difficult to correct a variety of aberrations. In addition, the diameter of the fourth lens 32 will increase, it becomes difficult to secure the width outside the effective diameter, and manufacturing difficulty becomes higher.

Inequality (6) may be replaced with inequality (6a), (6b), or (6c) below. These configurations can ensure the effects of each example.

$$0.30 < (f3-f2)/f4 < 1.40 \tag{6a}$$

$$0.35 < (f3-f2)/f4 < 1.25 \tag{6b}$$

$$0.40 < (f3-f2)/f4 < 1.20 \tag{6c}$$

In the optical system according to each example, only the fourth lens 32 or the fourth lens 32 and the third lens 22 serve to correct aberrations on the image side of the aperture stop SP. In a case where the third lens 22 is placed closer to the image plane than the aperture stop SP, as in Examples 8 and 9, a distance from the aperture stop SP to the third lens 22 is short, and the on-axis light and the off-axis light are less separated from each other at the third lens 22. Therefore, the fourth lens 32 mainly serves to correct off-axis aberrations on the image side of the aperture stop SP. Hence, the distance from the aperture stop SP to the fourth lens 32 and the power of the fourth lens 32 may be properly set. The following inequality (7) may be satisfied:

$$0.030 < d/f4 < 0.390 \tag{7}$$

where d is a distance on the optical axis from the aperture stop SP to the surface on the object side of the fourth lens 32.

In a case where the value is lower than the lower limit of inequality (7), the power of the fourth lens 32 becomes small, and it becomes difficult to correct aberrations occurring on the image side of the aperture stop SP. On the other hand, in a case where the value is higher than the upper limit of inequality (7), a ray angle incident on the outer circumference portion of the fourth lens 32 becomes gentle, and it becomes difficult to correct high-order aberrations.

Inequality (7) may be replaced with inequality (7a) or (7b) below. These configurations can ensure the effects of each example.

$$0.040 < d/f4 < 0.385 \tag{7a}$$

$$0.050 < d/f4 < 0.380 \tag{7b}$$

A detailed description will now be given of the optical system according to each example.

Example 1

Figure 2:
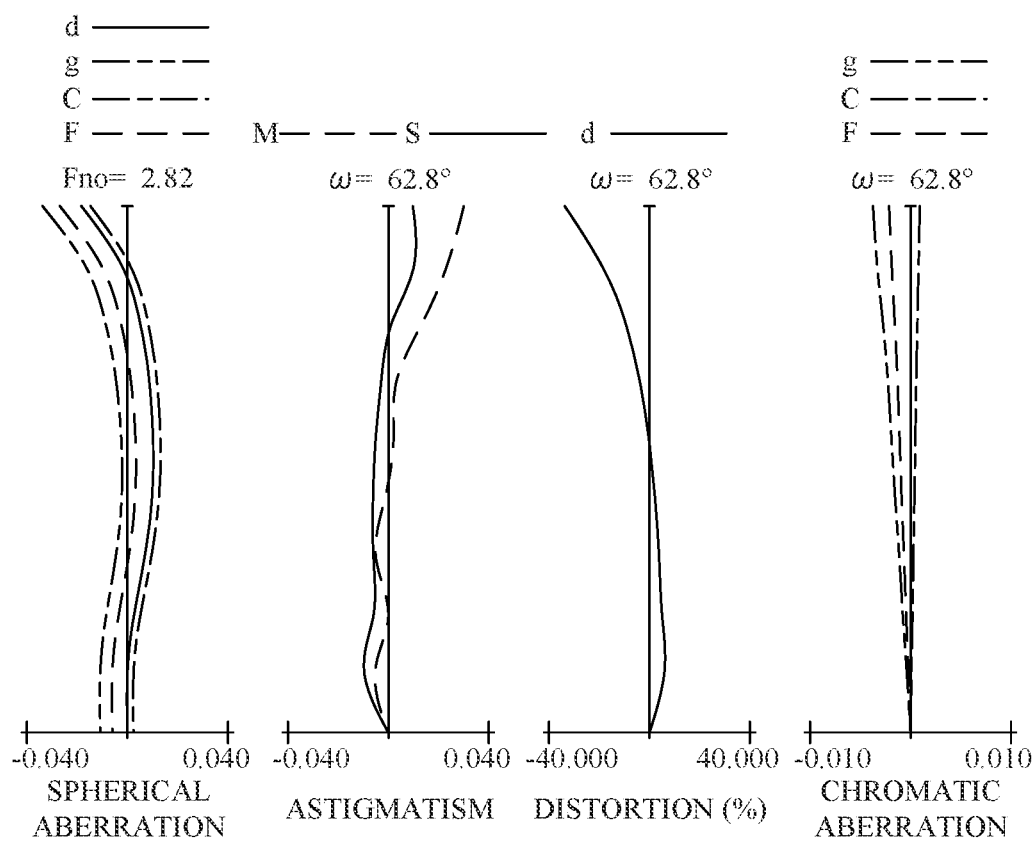
FIG. 2 is an aberration diagram of the optical system according to Example 1.

Referring now to FIGS. 1 and 2, a description will be given of the optical system 1a according to Example 1 (numerical example 1).

As illustrated in FIG. 1, the optical system 1a consists of the first unit L1, the second unit L2, and the third unit L3. The first unit L1 includes the first substrate 11, the first lens 12 disposed on the object side of the first substrate 11, and the second lens 13 disposed on the image side of the first substrate 11. The first lens 12 is a negative lens with a concave surface facing the object side, and the second lens 13 is a negative lens with a concave surface facing the image side on or near the optical axis OA. The first lens 12 and the second lens 13 are formed on the surface on the object side and the surface on the image side of the first substrate 11, respectively, using the wafer level process.

The second unit L2 includes the second substrate 21, the third lens 22 disposed on the object side of the second substrate 21, and the aperture stop SP disposed on the image side of the second substrate 21. The third lens 22 is formed on the surface on the object side of the second substrate 21 using the wafer level process. The third unit L3 includes the third substrate 31, the fourth lens 32 disposed on the object side of the third substrate 31, and the sensor cover glasses 41 and 42 disposed on the image side of the third substrate 31. The fourth lens 32 is formed on the surface on the object side of the third substrate 31 using the wafer level process. The third substrate 31 is cemented with the sensor cover glasses 41 and 42. In this example, the sensor cover glasses 41 and 42 have different refractive indices. In this example, the aperture stop SP is formed on the image side of the second substrate 21. The optical system 1a is designed to focus on an object located at a position that is distant by 5 mm from the surface closest to the object of the first unit L1.

FIG. 2 is the longitudinal aberration diagram in a case where the optical system 1a according to this example is in focus at an object distance of 5 mm. FIG. 2 illustrates, in order from left to right, the spherical aberration diagram, the astigmatism diagram, the distortion diagram, and the lateral chromatic aberration diagram. The object distance is a distance from the first surface, and this is similarly applied to the other examples. In the longitudinal aberration diagrams, Fno denotes an F-number, and ω denotes half an angle of view (°). In the spherical aberration diagram, a solid line denotes a spherical aberration for the d-line (having a wavelength 587.6 nm), an alternate long and two short dashes line denotes a spherical aberration amount for the g-line (having a wavelength 435.8 nm), an alternate long and short dash line denotes a spherical aberration amount for the C-line (having a wavelength 656.3 nm), and a broken line denotes a spherical aberration amount for the f-line (having a wavelength 486.1 nm). In the astigmatism diagram, a solid line S indicates an astigmatism amount on a sagittal image plane, and a dashed line M indicates an astigmatism amount on a meridional image plane, both for the d-line. The distortion diagram illustrates a distortion amount for the d-line. The chromatic aberration diagram illustrates lateral chromatic aberration amounts for the g-line, C-line, and F-line, and the correspondence between line types and wavelengths is similar to that in the spherical aberration diagram. This is similarly applicable to the longitudinal aberration diagrams in the other examples.

Example 2

Figure 3:
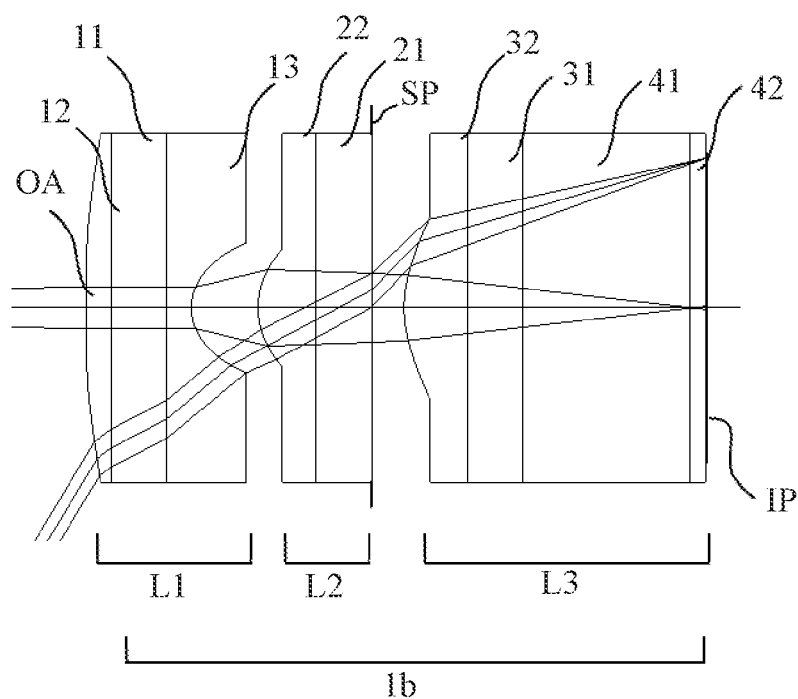
FIG. 3 is a sectional view of an optical system according to Example 2.
Figure 4:
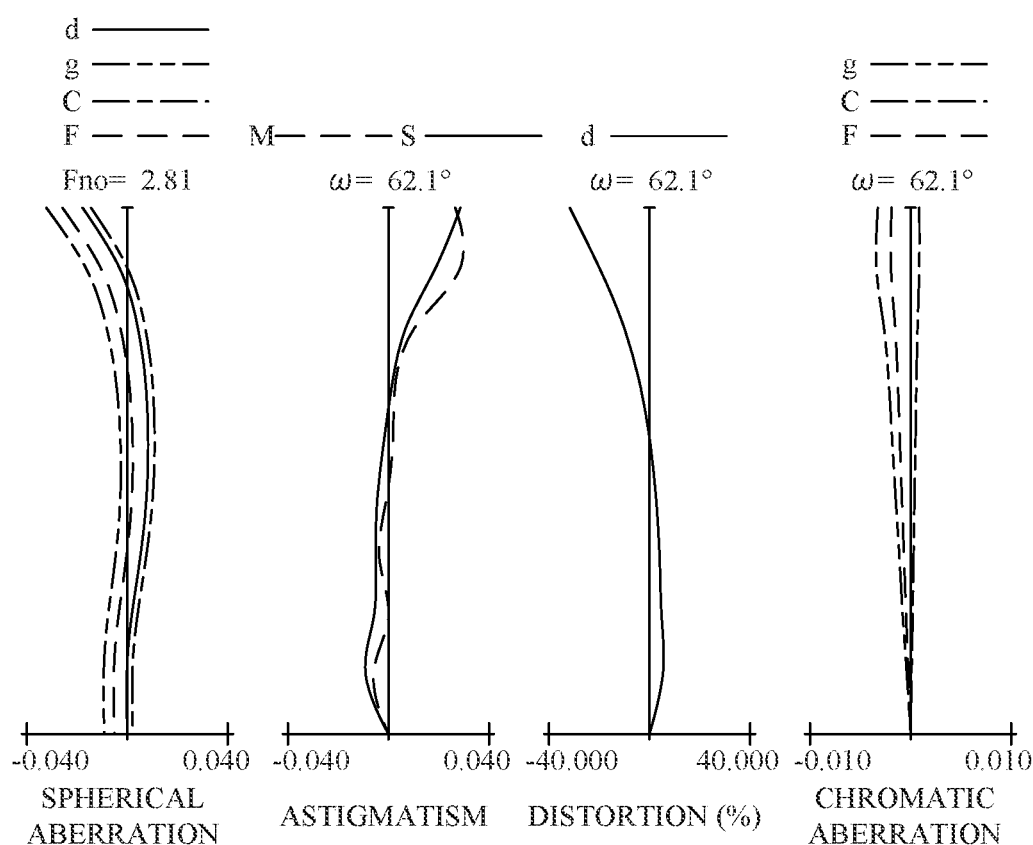
FIG. 4 is an aberration diagram of the optical system according to Example 2.

Referring now to FIGS. 3 and 4, a description will be given of the optical system 1b according to Example 2 (numerical example 2). As illustrated in FIG. 3, the basic configuration of the optical system 1b according to this example is similar to that of the optical system 1a of Example 1. The optical system 1b is designed to be in focus on an object located at a position distant by 5 mm from the surface closest to the object of the first unit L1. FIG. 4 is the longitudinal aberration diagram in a case where the optical system 1b is in focus at an object distance of 5 mm.

Example 3

Figure 5:
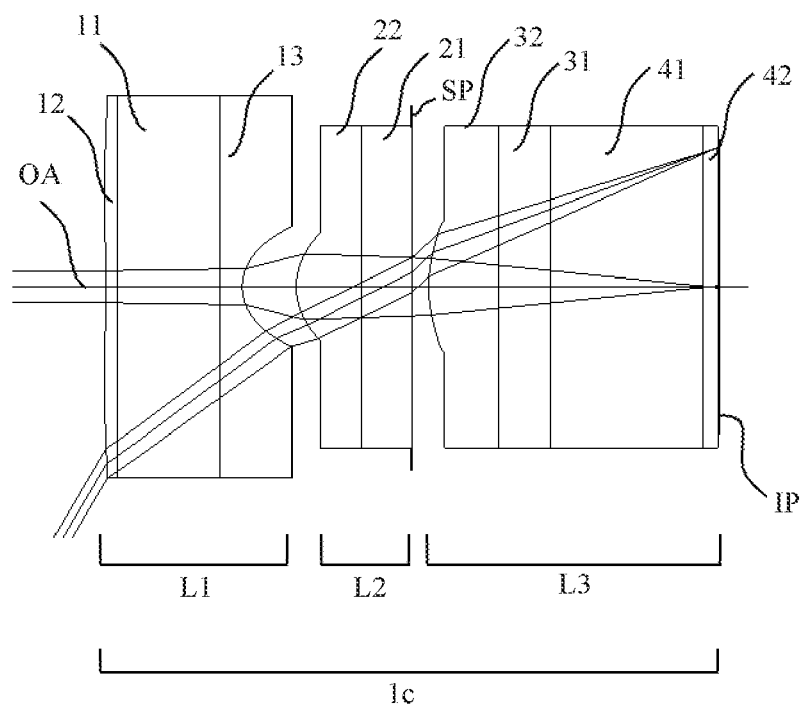
FIG. 5 is a sectional view of an optical system according to Example 3.
Figure 6:
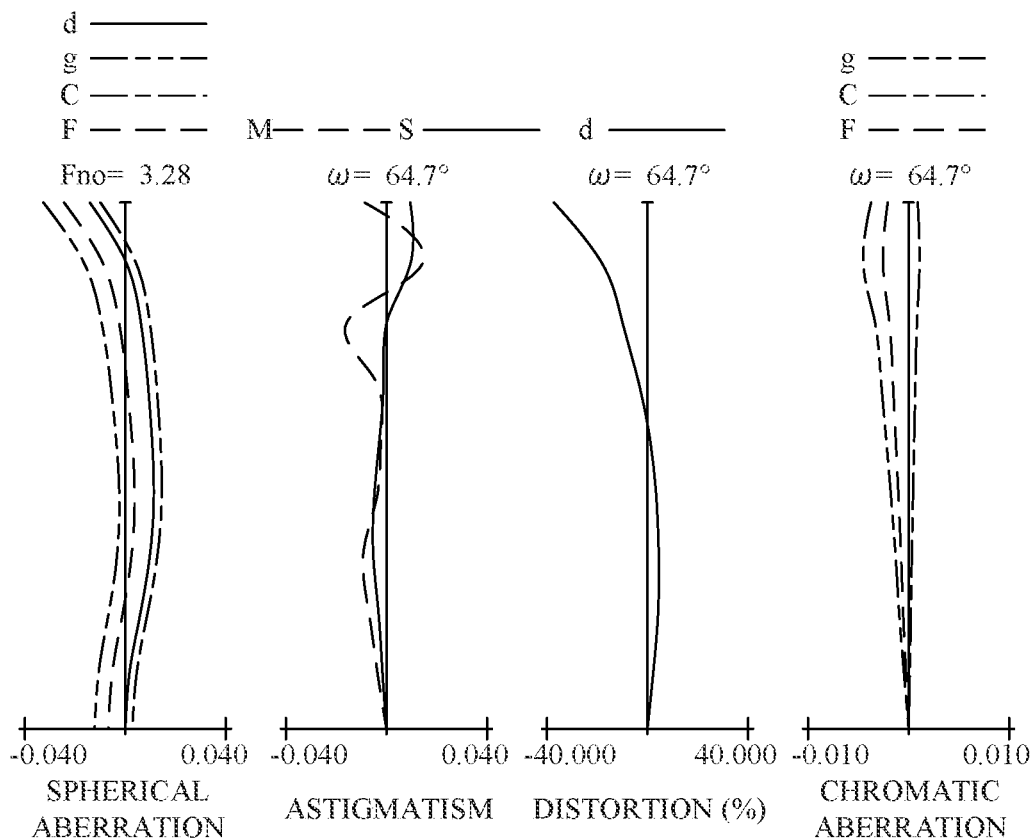
FIG. 6 is an aberration diagram of the optical system according to Example 3.

Referring now to FIGS. 5 and 6, a description will be given of the optical system 1c according to Example 3 (numerical example 3). As illustrated in FIG. 5, the basic configuration of the optical system 1c according to this example is similar to that of the optical system 1a of Example 1. The optical system 1c is designed to be in focus on an object located at a position distant by 5 mm from the surface closest to the object of the first unit L1. FIG. 6 is the longitudinal aberration diagram in a case where the optical system 1c is in focus at an object distance of 5 mm.

Example 4

Figure 7:
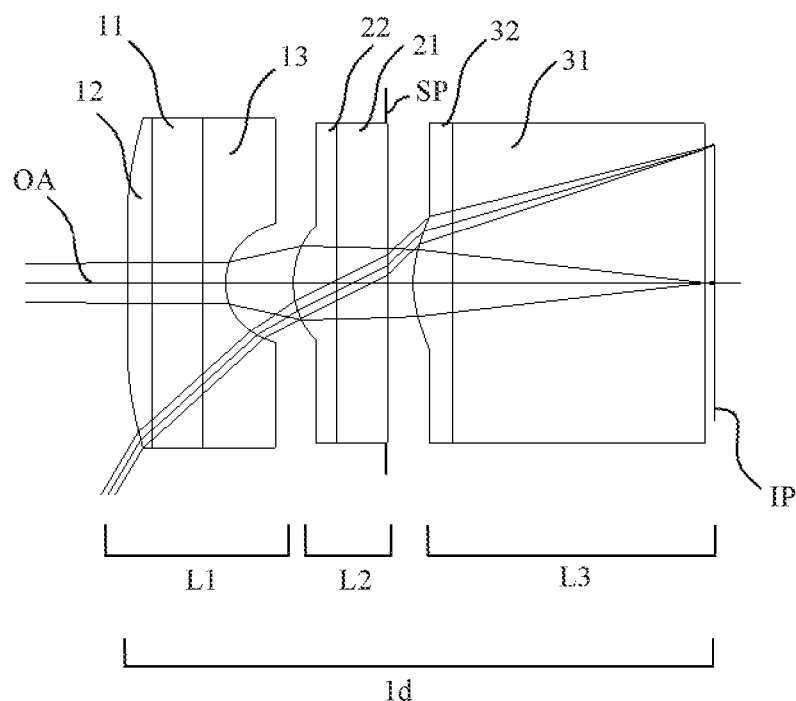
FIG. 7 is a sectional view of an optical system according to Example 4.
Figure 8:
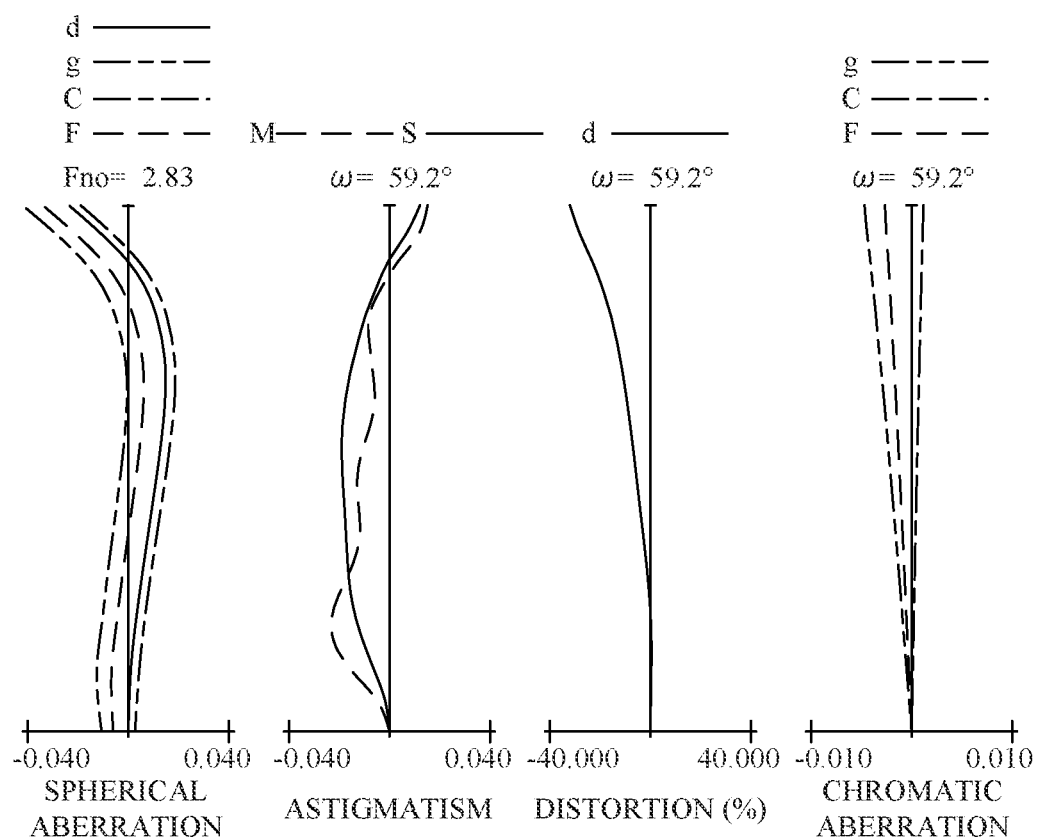
FIG. 8 is an aberration diagram of the optical system according to Example 4.

Referring now to FIGS. 7 and 8, a description will be given of the optical system 1d according to Example 4 (numerical example 4). As illustrated in FIG. 7, the basic configuration of the first unit L1 and the second unit L2 of the optical system 1d according to this example is similar to that of the optical system 1a of Example 1. In the third unit L3, the fourth lens 32 is formed on the surface on the object side of the third substrate 31 using the wafer level process. The third substrate 31 also serves as a sensor cover glass. The optical system 1d is designed to be in focus on an object located at a position distant by 5 mm from the surface closest to the object of the first unit L1. FIG. 8 is the longitudinal aberration diagram in a case where the optical system 1d is in focus at an object distance of 5 mm.

Example 5

Figure 9:
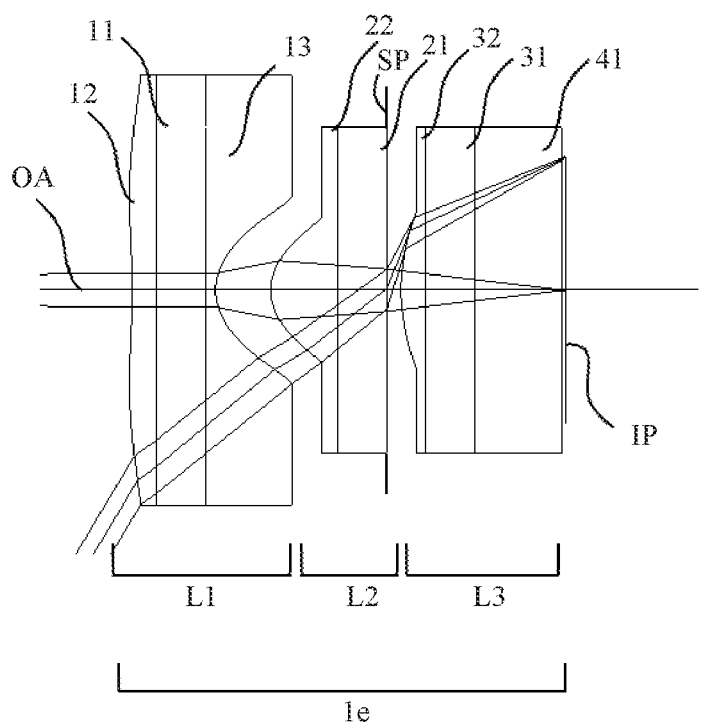
FIG. 9 is a sectional view of an optical system according to Example 5.
Figure 10:
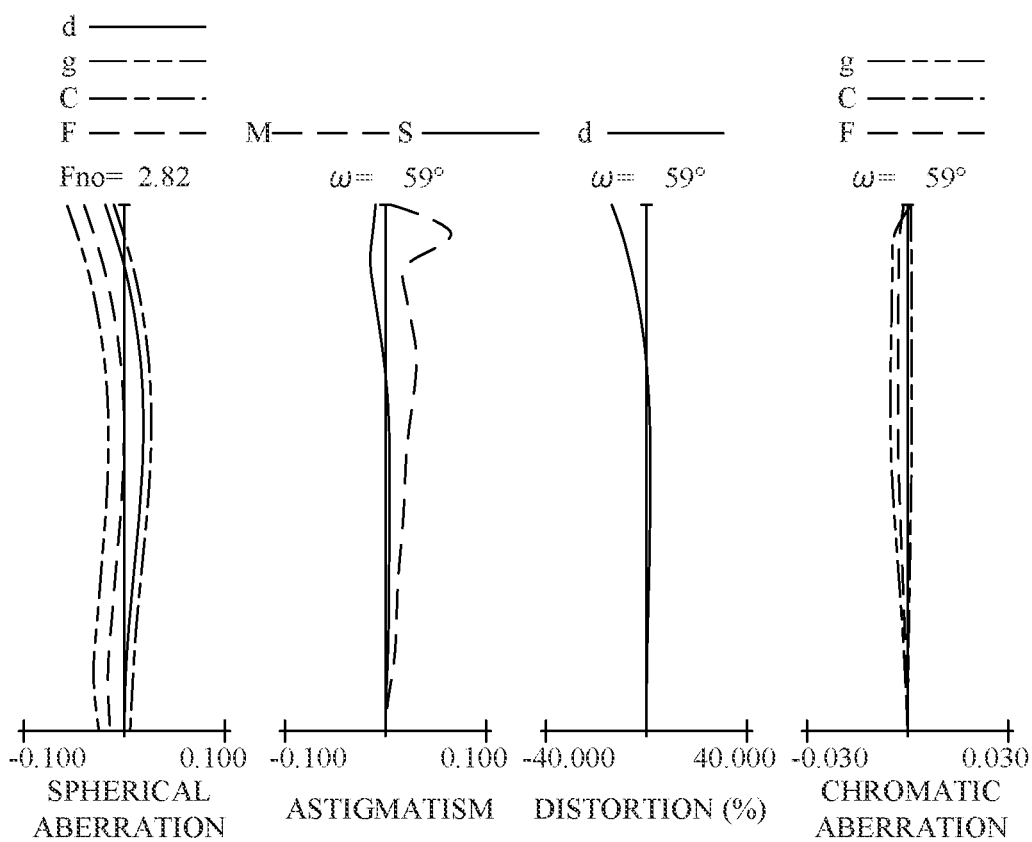
FIG. 10 is an aberration diagram of the optical system according to Example 5.

Referring now to FIGS. 9 and 10, a description will be given of the optical system 1e according to Example 5 (numerical example 5). As illustrated in FIG. 9, the basic configuration of the first unit L1 and the second unit L2 of the optical system 1e according to this example is similar to that of the optical system 1d of Example 4. In the third unit L3, the fourth lens 32 is formed on the surface on the object side of the third substrate 31 using the wafer level process. The third substrate 31 also serves as a back cover glass and is cemented with the sensor cover glass 41. The optical system 1e is designed to be in focus on an object located at a position distant by 50 mm from the surface closest to the object of the first unit L1. FIG. 10 is the longitudinal aberration diagram in a case where the optical system 1e is in focus at an object distance of 50 mm.

Example 6

Figure 11:
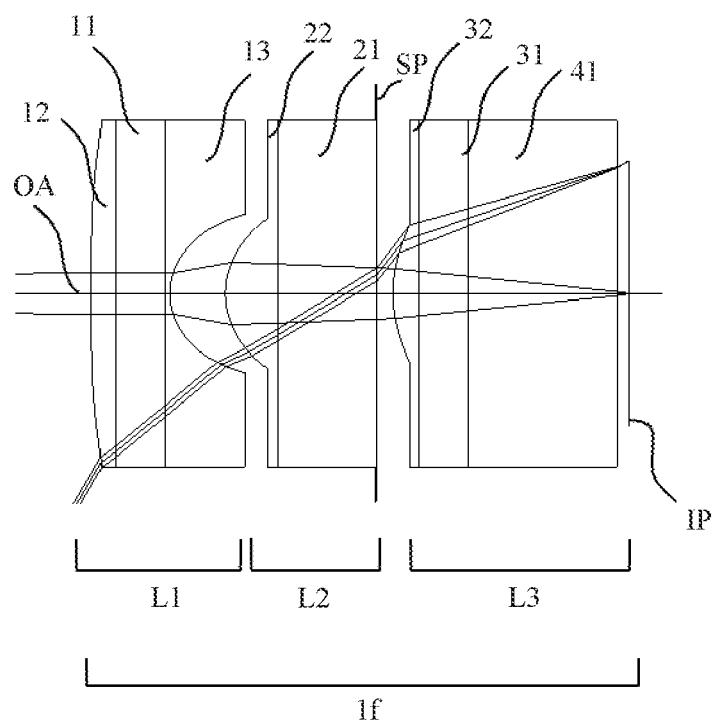
FIG. 11 is a sectional view of an optical system according to Example 6.
Figure 12:
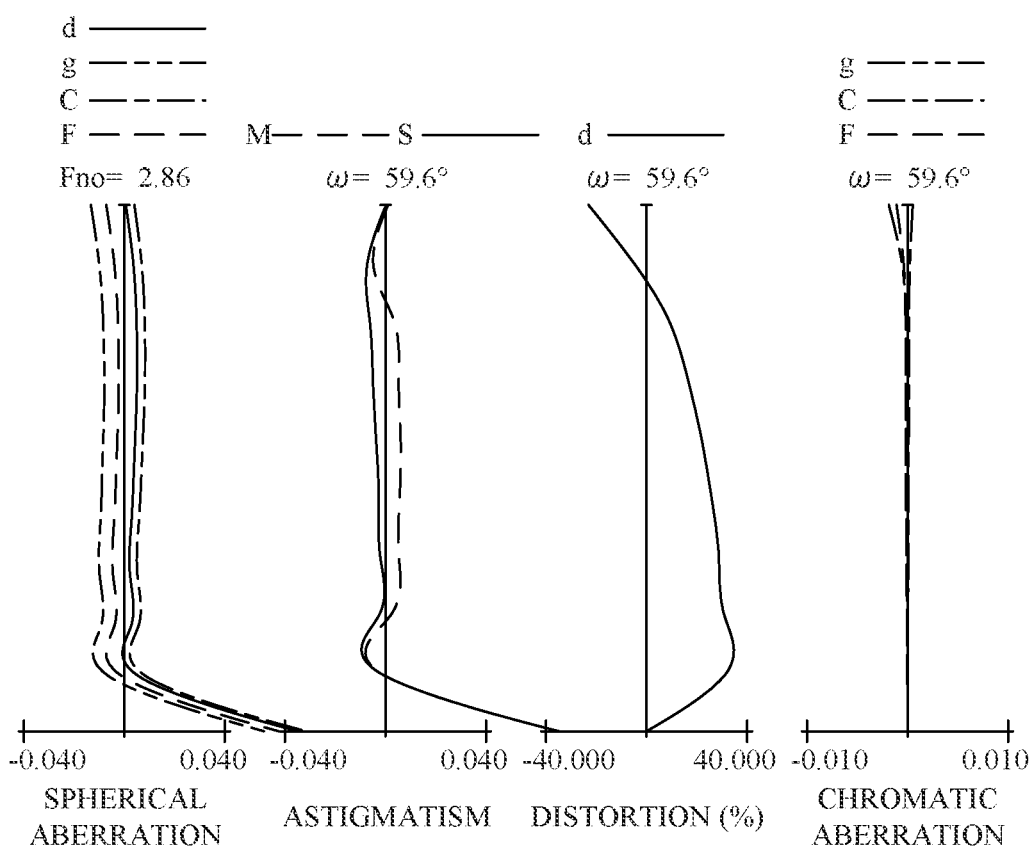
FIG. 12 is an aberration diagram of the optical system according to Example 6.

Referring now to FIGS. 11 and 12, a description will be given of the optical system 1f according to Example 6 (numerical example 6). As illustrated in FIG. 11, the basic configuration of the optical system 1f according to this example is similar to that of the optical system 1d of Example 4. In the optical system 1f, the third substrate 31 is used as the sensor cover glass, the lens surface of the fourth lens 32 is formed on the object side of the third substrate 31, and the third substrate 31 serves as both the sensor cover glass and the back cover glass. The optical system 1f is designed to be in focus on an object located at a position distant by 10 mm from the surface closest to the object of the first unit L1. FIG. 12 is the longitudinal aberration diagram in a case where the optical system 1f is in focus at an object distance of 10 mm.

Example 7

Figure 13:
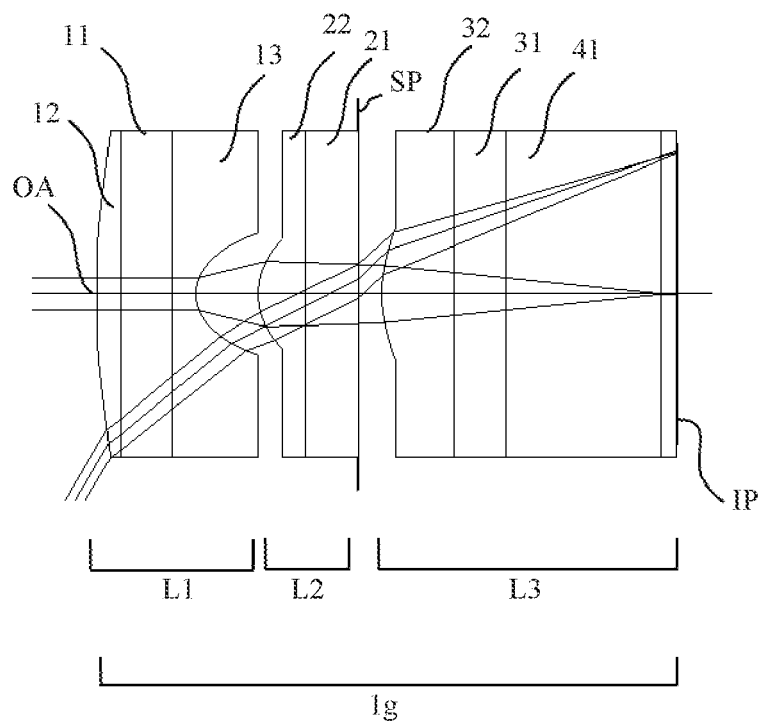
FIG. 13 is a sectional view of an optical system according to Example 7.
Figure 14:
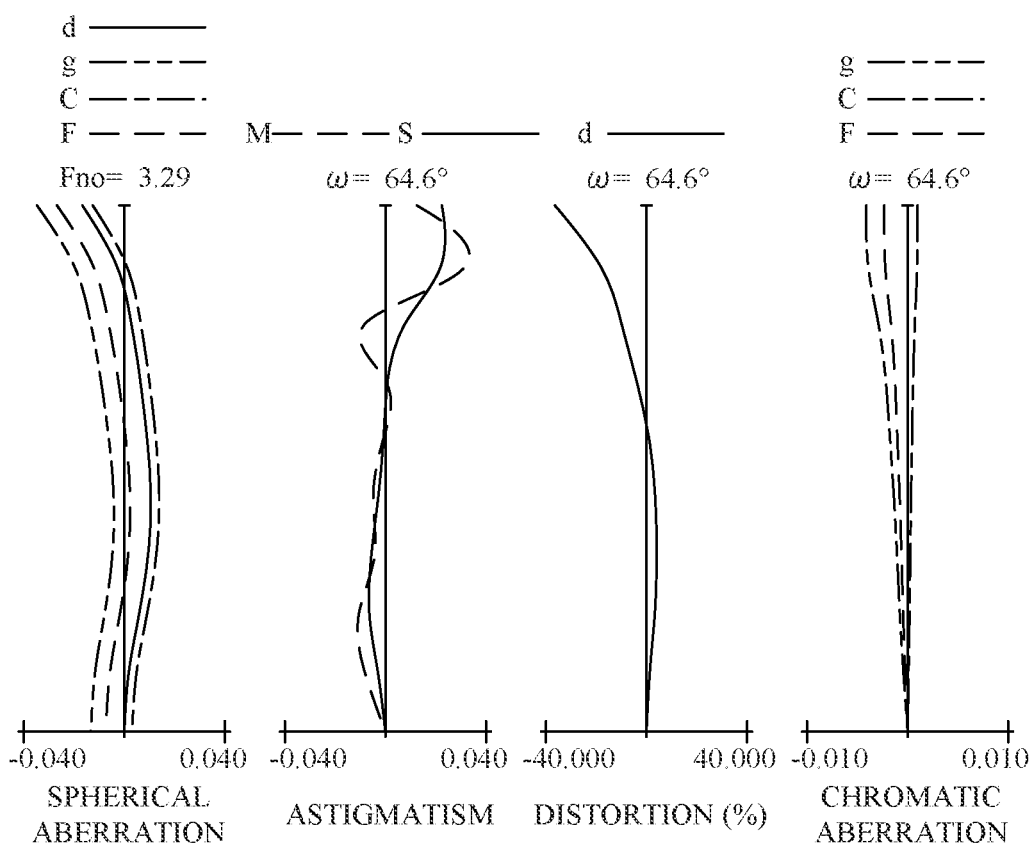
FIG. 14 is an aberration diagram of the optical system according to Example 7.

Referring now to FIGS. 13 and 14, a description will be given of the optical system 1g according to Example 7 (numerical example 7). As illustrated in FIG. 13, the basic configuration of the optical system 1g according to this example is similar to that of the optical system 1a of Example 1. The optical system 1g is designed to be in focus on an object located at a position distant by 5 mm from the surface closest to the object of the first unit L1. FIG. 14 is the longitudinal aberration diagram in a case where the optical system 1g is in focus at an object distance of 5 mm.

Example 8

Figure 15:
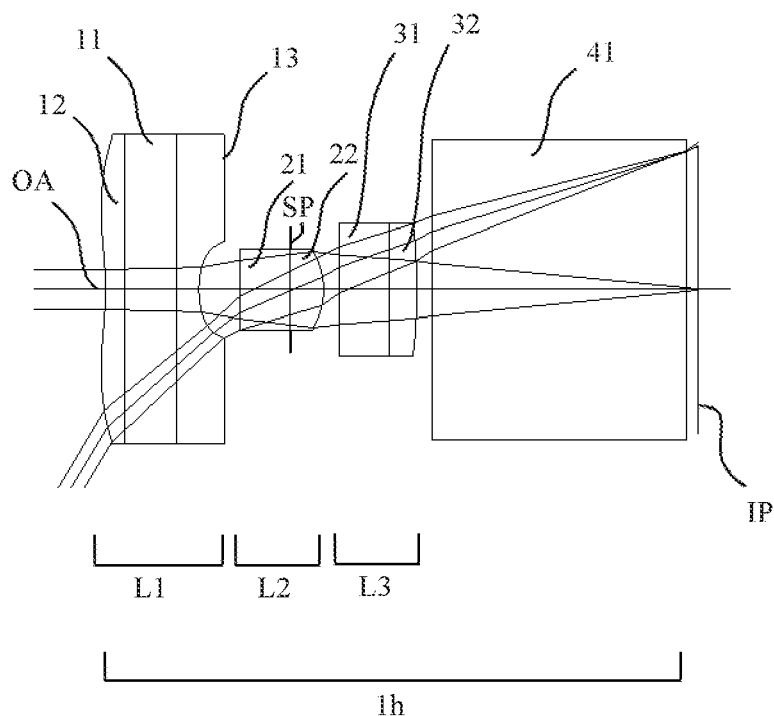
FIG. 15 is a sectional view of an optical system according to Example 8.
Figure 16:
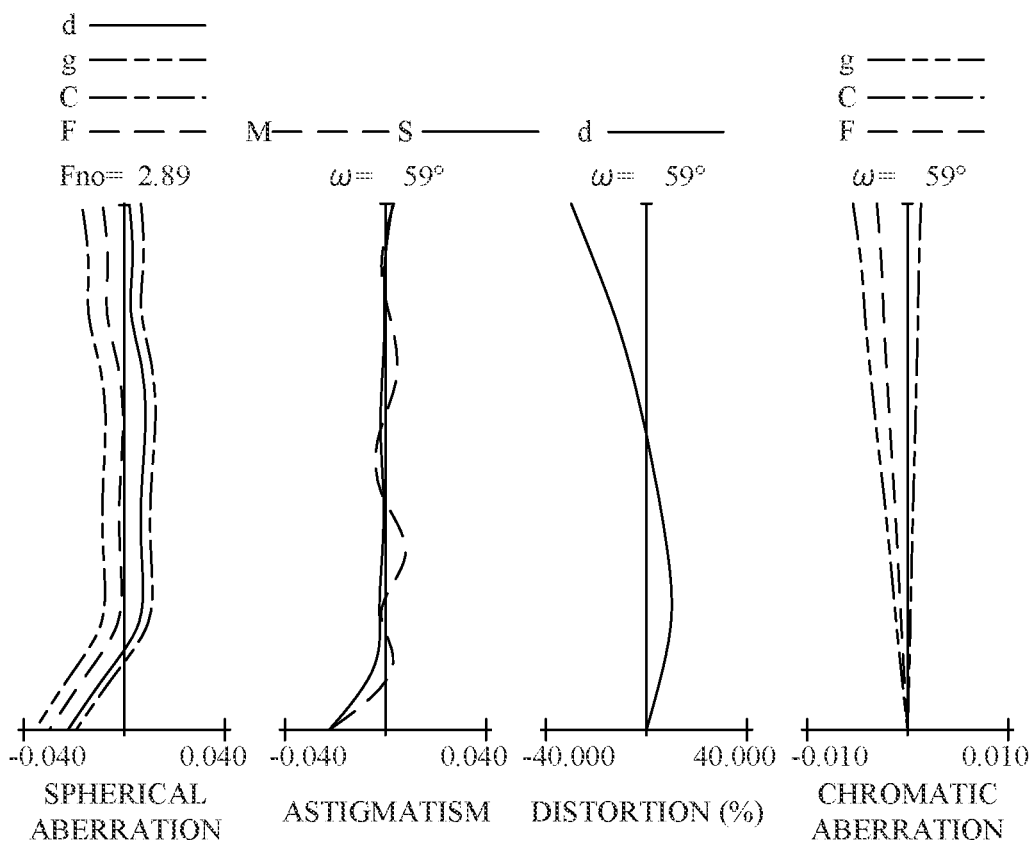
FIG. 16 is an aberration diagram of the optical system according to Example 8.

Referring now to FIGS. 15 and 16, a description will be given of the optical system 1h according to Example 8 (numerical example 8). As illustrated in FIG. 15, the basic configuration of the first unit L1 in the optical system 1h according to this example is similar to that of the optical system 1a of Example 1. The second unit L2 includes the second substrate 21, the third lens 22 disposed on the image side of the second substrate 21, and the aperture stop SP disposed between the second substrate 21 and the third lens 22. The third lens 22 is formed on the surface on the image side of the second substrate 21 using the wafer level process. The fourth lens 32 is formed on the surface on the image side of the third substrate 31 using the wafer level process. The optical system 1h is designed to be in focus on an object located at a position distant by 10 mm from the surface closest to the object of the first unit L1. FIG. 16 is the longitudinal aberration diagram in a case where the optical system 1h is in focus at an object distance of 10 mm.

Example 9

Figure 17:
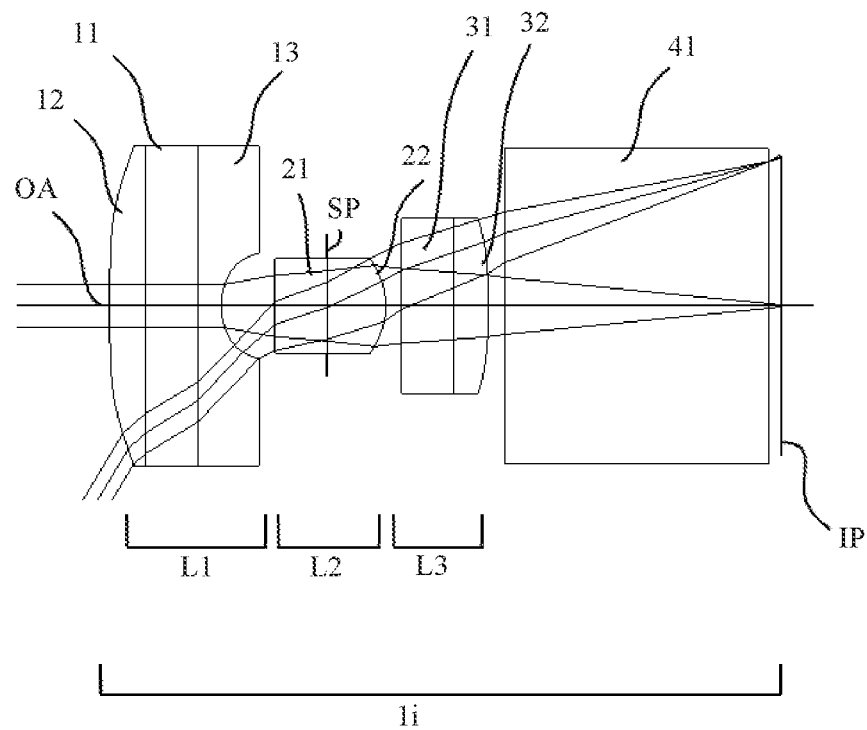
FIG. 17 is a sectional view of an optical system according to Example 9.
Figure 18:
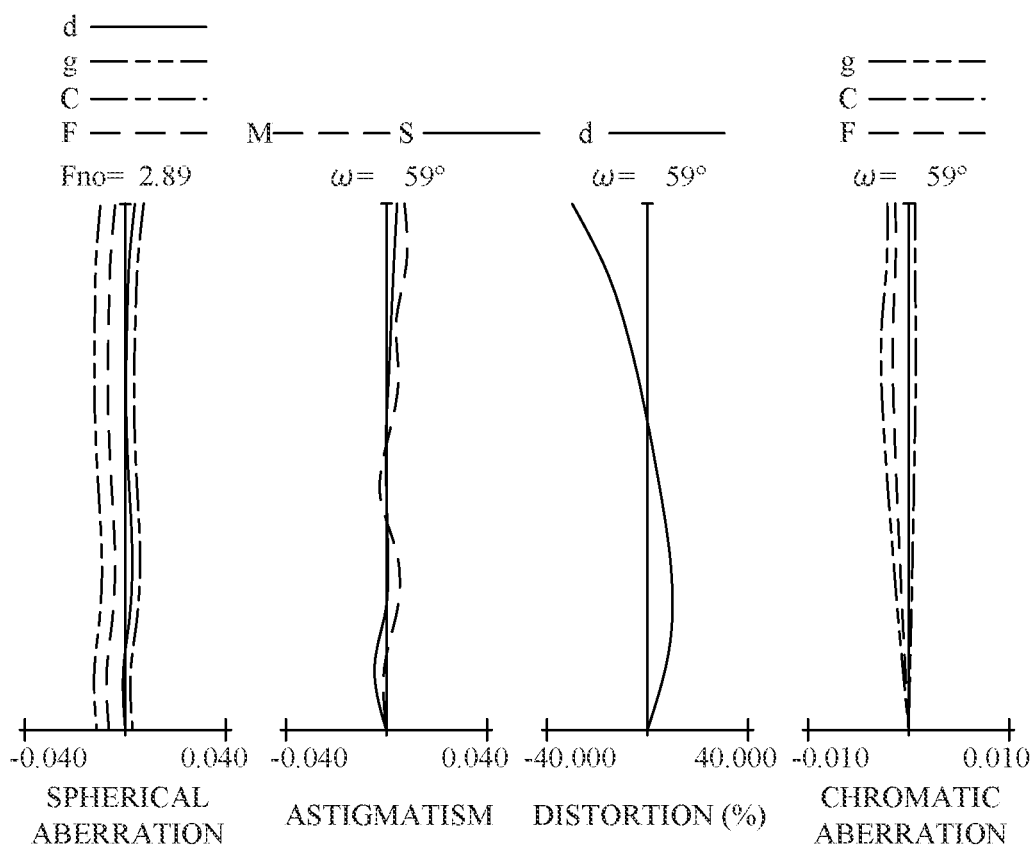
FIG. 18 is an aberration diagram of the optical system according to Example 9.

Referring now to FIGS. 17 and 18, a description will be given of the optical system 1i according to Example 9 (numerical example 9). As illustrated in FIG. 17, the basic configuration of the optical system 1i according to this example is similar to that of the optical system 1h of Example 8. The optical system 1i is designed to be in focus on an object located at a position distant by 10 mm from the surface closest to the object of the first unit L1. FIG. 18 is the longitudinal aberration diagram in a case where the optical system 1i is in focus at an object distance of 10 mm.

Example 10

Figure 19:
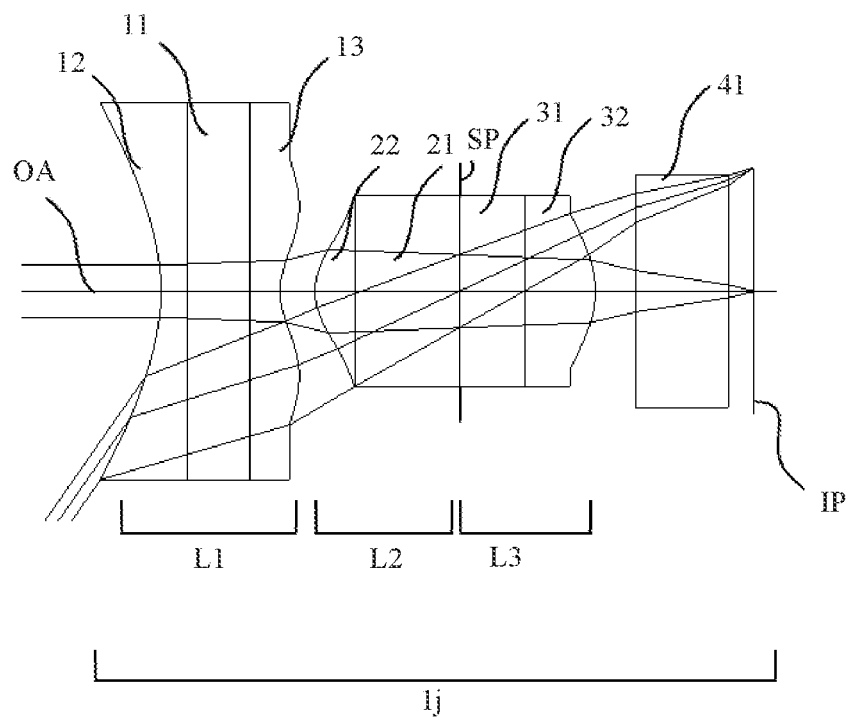
FIG. 19 is a sectional view of an optical system according to Example 10.
Figure 20:
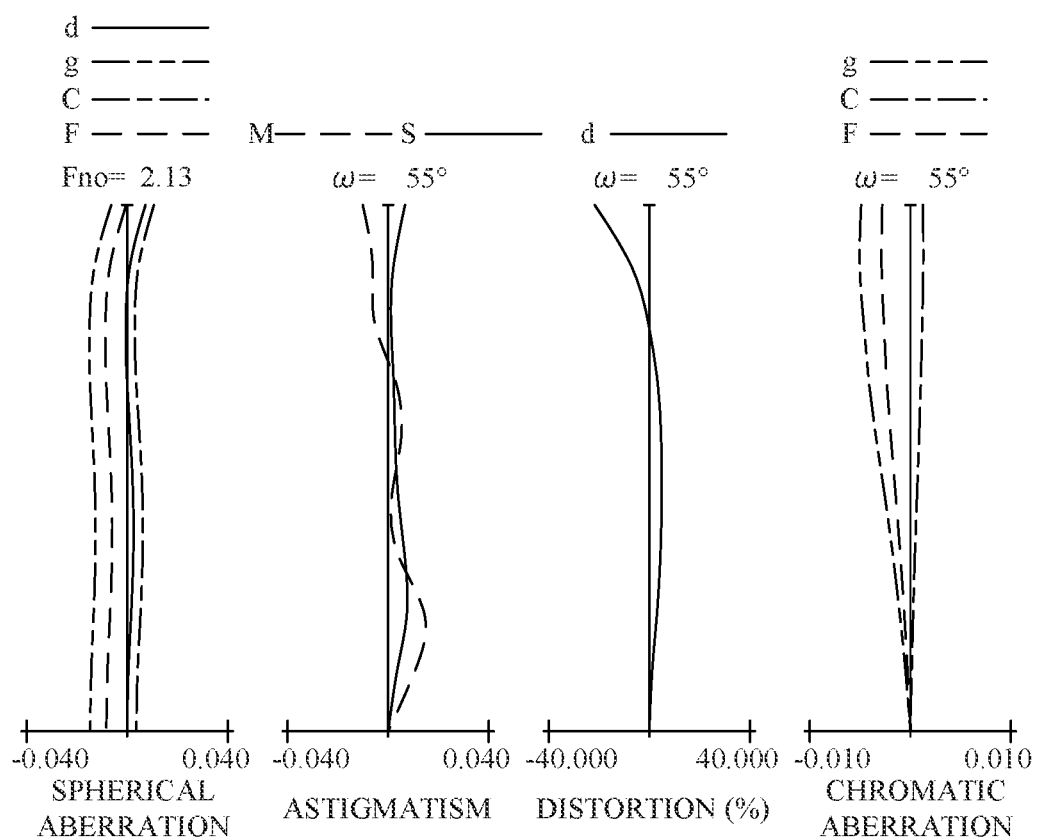
FIG. 20 is an aberration diagram of the optical system according to Example 10.

Referring now to FIGS. 19 and 20, a description will be given of the optical system 1j according to Example 10 (numerical example 10). As illustrated in FIG. 19, the basic configuration of the first unit L1 in the optical system 1j according to this example is similar to that of the optical system 1a of Example 1. The second unit L2 includes the second substrate 21 and the third lens 22 disposed on the object side of the second substrate 21. The third lens 22 is formed on the surface on the object side of the second substrate 21 using the wafer level process. The third unit L3 includes the third substrate 31 and the fourth lens 32 disposed on the image side of the third substrate 31. The fourth lens 32 is formed on the surface on the image side of the third substrate 31 using the wafer level process.

The second substrate 21 and the third substrate 31 are cemented together, and the aperture stop SP is disposed on the cemented surface between the second substrate 21 and the third substrate 31. The aperture stop SP may be formed on the second substrate 21, and the surface of the second substrate 21 on which the aperture stop SP is formed may be cemented with the third substrate 31. Alternatively, the aperture stop SP may be formed on the third substrate 31, and the surface of the third substrate 31 on which the aperture stop SP is formed may be cemented with the second substrate 21. The optical system 1j is designed to be in focus on an object at infinity from the surface closest to the object of the first unit L1. FIG. 20 is the longitudinal aberration diagram in a case where the optical system 1j is in focus at an object distance of infinity.

Example 11

Figure 21:
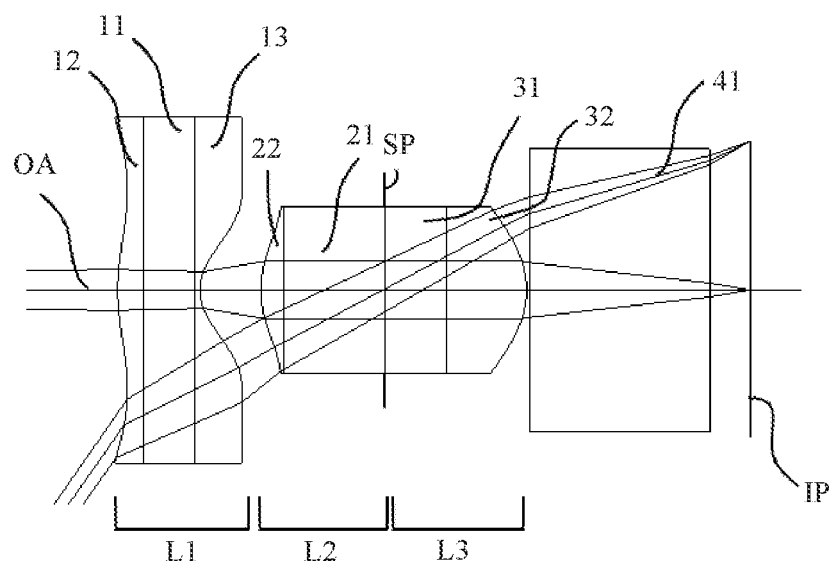
FIG. 21 is a sectional view of an optical system according to Example 11.

Referring now to FIGS. 20 and 21, a description will be given of the optical system 1k according to Example 11 (numerical example 11). As illustrated in FIG. 20, the basic configuration of the optical system 1k according to this example is similar to that of the optical system 1j of Example 10. The optical system 1k is designed to be in focus on an object located at a position distant by 5 mm from the surface closest to the object of the first unit L1. FIG. 21 is the longitudinal aberration diagram in a case where the optical system 1k is in focus at an object distance of 5 mm.

Example 12

Figure 22:
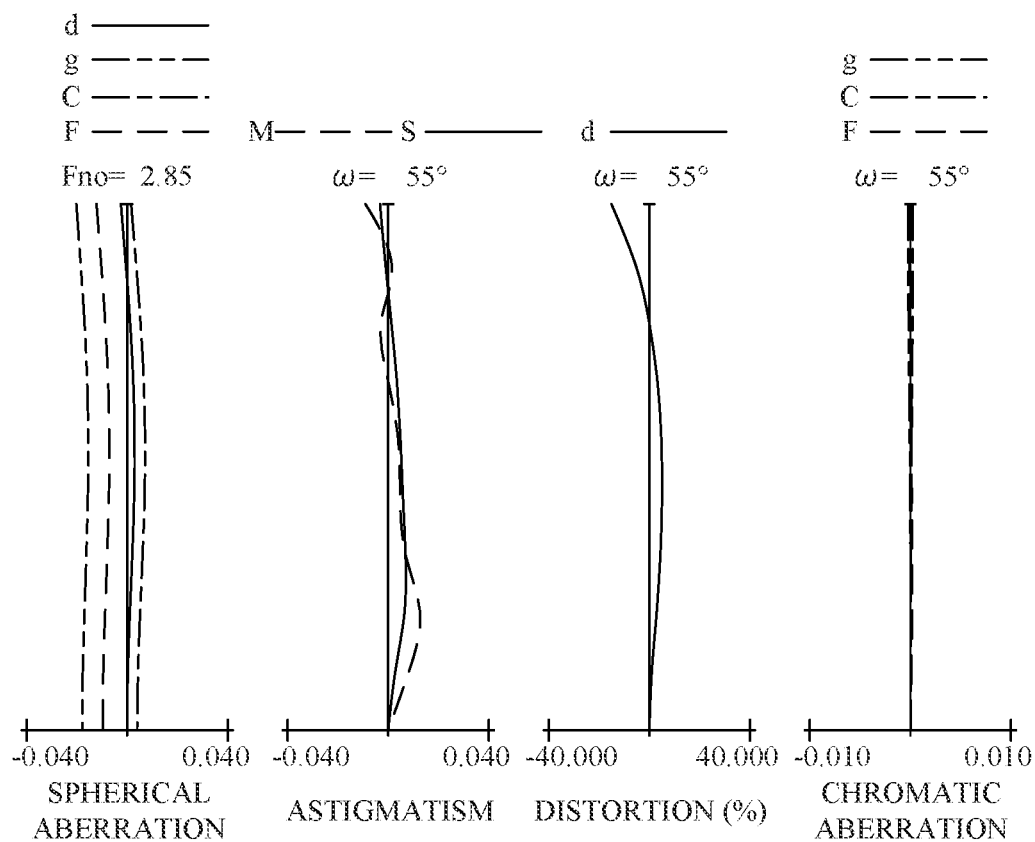
FIG. 22 is an aberration diagram of the optical system according to Example 11.
Figure 23:
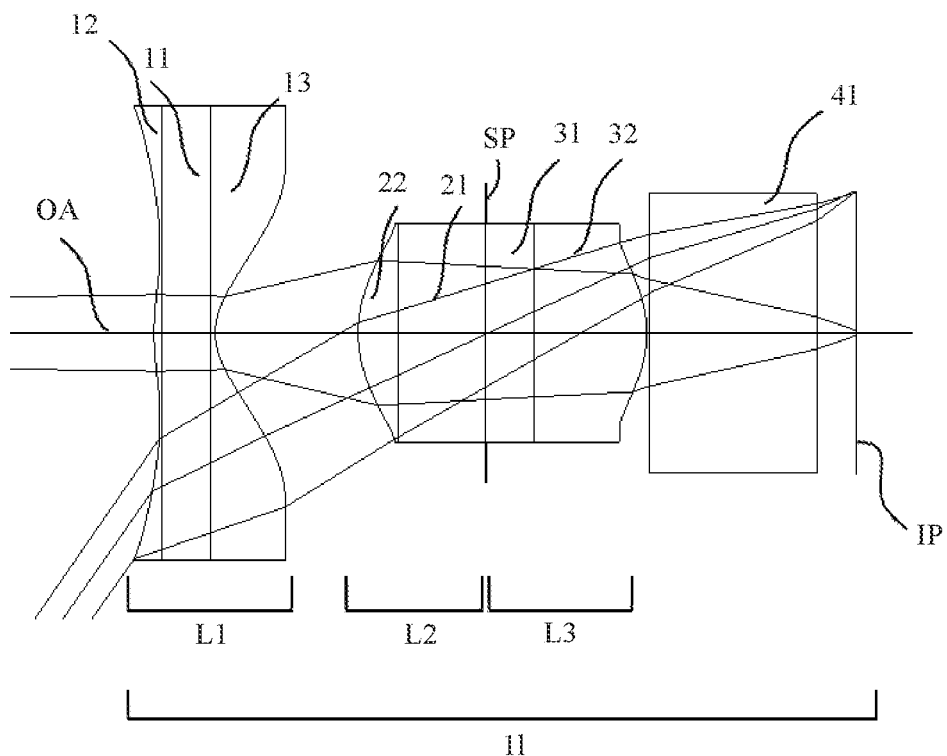
FIG. 23 is a sectional view of an optical system according to Example 12.
Figure 24:
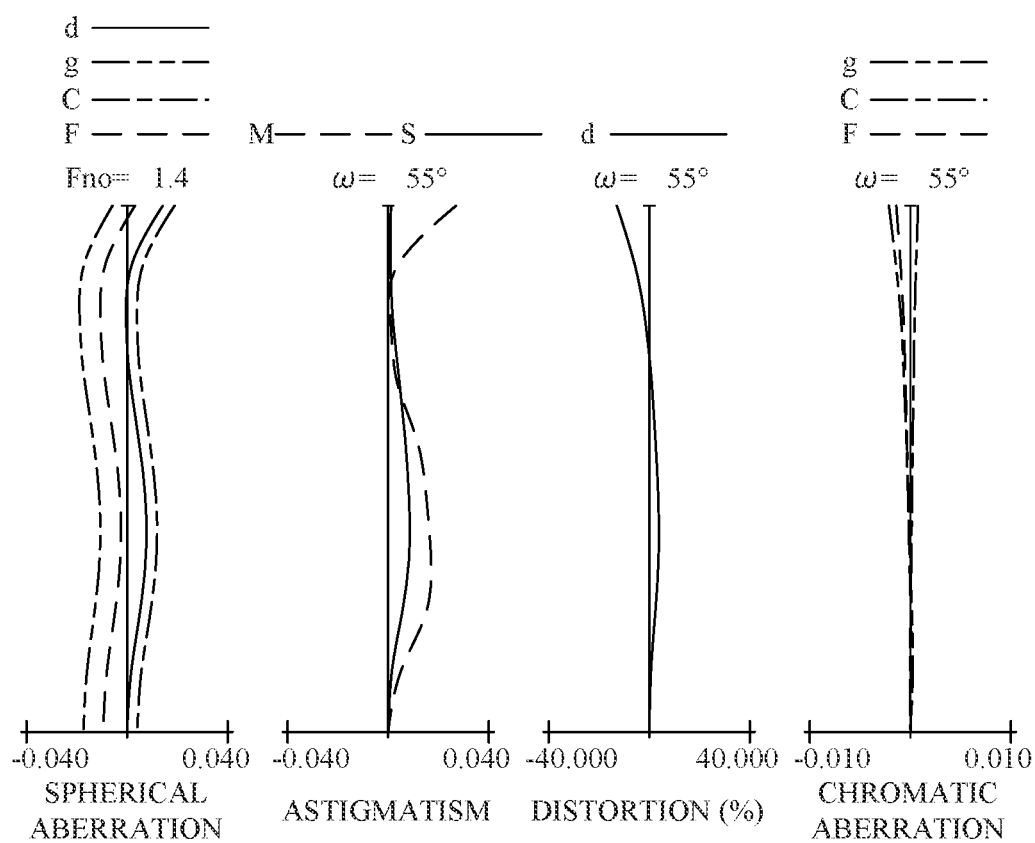
FIG. 24 is an aberration diagram of the optical system according to Example 12.

Referring now to FIGS. 22 and 23, a description will be given the optical system 1l according to Example 12 (numerical example 12). As illustrated in FIG. 22, the basic configuration of the optical system 1l according to this example is similar to that of the optical system 1j of Example 10. The optical system 1l is designed to be in focus on an object located at a position distant by 5 mm from the surface closest to the object of the first unit L1. FIG. 23 is the longitudinal aberration diagram in a case where the optical system 1l is in focus at an object distance of 5 mm.

As illustrated in the spherical aberration diagram according to each example, the spherical aberration amount according to each example is in the range of 0.04 mm or less over almost the entire area. As illustrated in the astigmatism diagram according to each example, the astigmatism amount of each example is in the range of 0.04 mm or less over almost the entire area. As illustrated in the distortion diagram according to each example, the distortion amount of each example is in the range of less than 40% over the entire area. Thus, the optical system according to each example has proper aberrations.

Numerical examples 1 to 12 corresponding to Examples 1 to 12 will be illustrated below. In each numerical example, r denotes a radius of curvature (mm) of an i-th surface counted from the object side, d denotes a distance on the optical axis between the i-th surface and an (i+1)-th surface (mm) counted from the object side, and nd and νd a refractive index and an Abbe number for the d-line of the i-th optical element. A value of each of the focal length f (mm), the F-number Fno, and the half angle of view ω (degrees) is illustrated in a case where an object is in focus on an object at infinity. BF denotes a back focus, and represents a distance from the final surface of the optical system to the image plane. An overall lens length is a distance from the first surface to the image plane. In a case where the optical surface is aspherical, an asterisk * is attached to the right side of the surface number. The aspherical shape is expressed as follows:

$$x(h) = \frac{\left(\frac{h^2}{r}\right)}{1+\sqrt{\left\{1-(1+k)\left(\frac{h}{r}\right)^2\right\}}} + A_4 h^4 + A_6 h^6 + A_8 h^8 + A_{10} h^{10} + \ldots$$

where x is a displacement amount from a surface vertex in the optical axis direction, h is a height from the optical axis in a direction orthogonal to the optical axis, R is a paraxial radius of curvature, k is a conical constant, $A_i$(i=4, 6, 8, . . . ) are aspherical coefficients of respective orders. "e±Z" in each aspherical coefficient means "×10$^{±Z}$."

NUMERICAL EXAMPLE 1
UNIT: mm

Surface Data:

NUMERICAL EXAMPLE 1
UNIT: mm

| Surface No. | r | d | nd | vd | Effective Diameter |
|---|---|---|---|---|---|
| 1* | −1.7066 | 0.037 | 1.63000 | 24.0 | 0.63 |
| 2 | ∞ | 0.100 | 1.51000 | 62.7 | 0.63 |
| 3 | ∞ | 0.045 | 1.52290 | 50.3 | 0.48 |
| 4* | 0.0903 | 0.096 | | | 0.23 |
| 5* | 0.1191 | 0.096 | 1.52290 | 50.3 | 0.21 |
| 6 | ∞ | 0.100 | 1.51000 | 62.7 | 0.63 |
| 7 (Aperture Stop) | ∞ | 0.039 | | | 0.11 |
| 8* | 0.2093 | 0.074 | 1.52290 | 50.3 | 0.26 |
| 9 | ∞ | 0.100 | 1.51000 | 62.7 | 0.63 |
| 10 | ∞ | 0.300 | 1.51000 | 62.7 | 0.63 |
| 11 | ∞ | 0.030 | 1.55000 | 43.0 | 0.63 |
| 12 | ∞ | (Variable) | | | 0.63 |
| Image Plane | ∞ | | | | |

Aspheric Data

1st Surface $K = -8.45941e+04$, $A4 = 4.89407e+00$, $A6 = -3.45385e+01$,
$A8 = -1.94676e+02$, $A10 = 6.27267e+03$, $A12 = -5.55737e+04$,
$A14 = 1.75383e+05$
4th Surface $K = -1.54423e+00$, $A4 = 1.87666e+02$, $A6 = -2.49567e+03$,
$A8 = -2.46411e+05$, $A10 = 1.08123e+08$, $A12 = -6.21060e+09$,
$A14 = 7.28742e+10$
5th Surface $K = -1.18834e+01$, $A4 = 7.05330e+02$, $A6 = -1.50622e+05$,
$A8 = 2.49522e+07$, $A10 = -2.53774e+09$, $A12 = 1.41239e+11$,
$A14 = -3.28024e+12$
8th Surface $K = -2.83247e+01$, $A4 = 1.60129e+02$, $A6 = -3.02316e+04$,
$A8 = 3.69223e+06$, $A10 = -2.54515e+08$, $A12 = 9.03363e+09$,
$A14 = -1.28024e+11$

| | |
|---|---|
| Focal Length | 0.215 |
| FNo | 2.823 |
| Half Angle of View | 62.848 |
| Image Height | 0.292 |
| Overall Lens Length | 1.020 |
| BF | 0.002 |
| Object Distance (from 1st Surface) | −5.000 |

NUMERICAL EXAMPLE 2
Surface Data:

| Surface No. | r | d | nd | vd | Effective Diameter |
|---|---|---|---|---|---|
| 1* | −1.8939 | 0.046 | 1.63000 | 24.0 | 0.63 |
| 2 | ∞ | 0.100 | 2.10420 | 17.0 | 0.63 |
| 3 | ∞ | 0.045 | 1.52290 | 50.3 | 0.48 |
| 4* | 0.0971 | 0.120 | | | 0.23 |
| 5* | 0.1413 | 0.106 | 1.52290 | 50.3 | 0.21 |
| 6 | ∞ | 0.100 | 1.51000 | 62.7 | 0.63 |
| 7 (Aperture Stop) | ∞ | 0.058 | | | 0.13 |
| 8* | 0.2030 | 0.115 | 1.50670 | 70.5 | 0.33 |
| 9 | ∞ | 0.100 | 1.51000 | 62.7 | 0.63 |
| 10 | ∞ | 0.300 | 1.51000 | 62.7 | 0.63 |
| 11 | ∞ | 0.030 | 1.55000 | 43.0 | 0.63 |
| 12 | ∞ | (Variable) | | | 0.63 |
| Image Plane | ∞ | | | | |

Aspheric Data

1st Surface $K = -1.00908e+05$, $A4 = 1.30289e+01$, $A6 = -2.67485e+02$,
$A8 = 2.98995e+03$, $A10 = -1.77955e+04$, $A12 = 4.22636e+04$,
$A14 = 6.63126e+03$
4th Surface $K = -3.18178e+00$, $A4 = 4.17077e+02$, $A6 = -3.12231e+04$,
$A8 = 4.27410e+06$, $A10 = -4.51905e+08$, $A12 = 2.73817e+10$,
$A14 = -6.63483e+11$
5th Surface $K = -1.49175e+01$, $A4 = 5.47753e+02$, $A6 = -1.06261e+05$,
$A8 = 1.66703e+07$, $A10 = -1.65309e+09$, $A12 = 9.04616e+10$,
$A14 = -2.06111e+12$
8th Surface $K = -1.26492e+01$, $A4 = 5.73037e+01$, $A6 = -4.13428e+03$,
$A8 = 1.84498e+05$, $A10 = -3.62708e+06$, $A12 = -7.16932e+06$,
$A14 = 8.80566e+08$

| | |
|---|---|
| Focal Length | 0.216 |
| FNo | 2.808 |
| Half Angle of View | 62.122 |
| Image Height | 0.292 |
| Overall Lens Length | 1.121 |
| BF | 0.002 |
| Object Distance (from 1st Surface) | −5.000 |

NUMERICAL EXAMPLE 3
Surface Data:

| Surface No. | r | d | nd | vd | Effective Diameter |
|---|---|---|---|---|---|
| 1* | −0.9679 | 0.021 | 1.63000 | 24.0 | 0.75 |
| 2 | ∞ | 0.200 | 1.51000 | 62.7 | 0.75 |
| 3 | ∞ | 0.045 | 1.52290 | 50.3 | 0.75 |
| 4* | 0.0950 | 0.106 | | | 0.23 |
| 5* | 0.1283 | 0.128 | 1.52290 | 50.3 | 0.21 |
| 6 | ∞ | 0.100 | 1.51000 | 62.7 | 0.63 |
| 7 (Aperture Stop) | ∞ | 0.033 | | | 0.11 |
| 8* | 0.2254 | 0.138 | 1.52290 | 50.3 | 0.26 |
| 9 | ∞ | 0.100 | 1.51000 | 62.7 | 0.63 |
| 10 | ∞ | 0.300 | 1.51000 | 62.7 | 0.63 |
| 11 | ∞ | 0.030 | 1.55000 | 43.0 | 0.63 |
| 12 | ∞ | (Variable) | | | 0.63 |
| Image Plane | ∞ | | | | |

Aspheric Data

1st Surface $K = 4.54706e+02$, $A4 = 3.87307e+00$, $A6 = -3.68087e+01$,
$A8 = -1.65168e+02$, $A10 = 5.67748e+03$, $A12 = -3.80028e+04$,
$A14 = 8.25375e+04$
4th Surface $K = -1.60507e+00$, $A4 = 2.65098e+02$, $A6 = -1.28325e+04$,
$A8 = 4.52718e+05$, $A10 = 2.07086e+07$, $A12 = -3.45843e+08$,
$A14 = -4.67512e+10$
5th Surface $K = -1.31851e+01$, $A4 = 6.93044e+02$, $A6 = -1.55513e+05$,
$A8 = 2.65090e+07$, $A10 = -2.76386e+09$, $A12 = 1.56251e+11$,
$A14 = -3.64229e+12$
8th Surface $K = -2.67990e+01$, $A4 = 1.36151e+02$, $A6 = -2.48758e+04$,
$A8 = 2.83384e+06$, $A10 = -1.52074e+08$, $A12 = 2.00454e+09$,
$A14 = 6.42297e+10$

| | |
|---|---|
| Focal Length | 0.216 |
| FNo | 3.277 |
| Half Angle of View | 64.742 |

-continued

NUMERICAL EXAMPLE 3

| | |
|---|---|
| Image Height | 0.292 |
| Overall Lens Length | 1.203 |
| BF | 0.002 |
| Object Distance (from 1st Surface) | −5.000 |

NUMERICAL EXAMPLE 4

Surface Data:

| Surface No. | r | d | nd | vd | Effective Diameter |
|---|---|---|---|---|---|
| 1* | −2.9404 | 0.048 | 1.51500 | 54.0 | 0.65 |
| 2 | ∞ | 0.100 | 1.51680 | 64.2 | 0.65 |
| 3 | ∞ | 0.045 | 1.51500 | 54.0 | 0.65 |
| 4* | 0.1171 | 0.134 | | | 0.23 |
| 5* | 0.1822 | 0.084 | 1.51500 | 54.0 | 0.22 |
| 6 | ∞ | 0.100 | 1.51680 | 64.2 | 0.63 |
| 7 (Aperture Stop) | ∞ | 0.052 | | | 0.14 |
| 8* | 0.1988 | 0.077 | 1.51500 | 54.0 | 0.26 |
| 9 | ∞ | 0.496 | 1.51680 | 64.2 | 0.63 |
| 10 | ∞ | (Variable) | | | 0.63 |
| Image Plane | ∞ | | | | |

Aspheric Data

1st Surface

K = 0.00000e+00, A4 = 8.20997e+00, A6 = −3.83404e+01, A8 = 1.44601e+01, A10 = −5.98561e+02, A12 = 5.38817e+03

4th Surface

K = −4.67432e+00, A4 = 2.53080e+02, A6 = 2.62591e+04, A8 = −8.45745e+06, A10 = 1.16591e+09, A12 = −7.18531e+10, A14 = 1.72091e+12

5th Surface

K = −3.88997e−01, A4 = 8.21018e+01, A6 = −2.37164e+04, A8 = 5.30410e+06, A10 = −6.03616e+08, A12 = 3.46711e+10, A14 = −7.81729e+11

8th Surface

K = −1.55046e+01, A4 = 9.23272e+01, A6 = −1.01709e+04, A8 = 8.42598e+05, A10 = −4.61653e+07, A12 = 1.45494e+09, A14 = −1.96793e+10

| | |
|---|---|
| Focal Length | 0.234 |
| FNo | 2.834 |
| Half Angle of View | 59.221 |
| Image Height | 0.280 |
| Overall Lens Length | 1.156 |
| BF | 0.020 |
| Object Distance (from 1st Surface) | −5.000 |

NUMERICAL EXAMPLE 5

Surface Data:

| Surface No. | r | d | nd | vd | Effective Diameter |
|---|---|---|---|---|---|
| 1* | −3.8573 | 0.150 | 1.63244 | 23.2 | 2.64 |
| 2 | ∞ | 0.300 | 1.51680 | 64.2 | 2.49 |
| 3 | ∞ | 0.059 | 1.52290 | 50.3 | 2.01 |
| 4* | 0.3037 | 0.340 | | | 1.15 |
| 5* | 0.3037 | 0.415 | 1.52290 | 50.3 | 0.88 |
| 6 | ∞ | 0.300 | 1.51680 | 64.2 | 2.00 |
| 7 (Aperture Stop) | ∞ | 0.085 | | | 0.26 |
| 8* | 0.8009 | 0.154 | 1.52290 | 50.3 | 0.98 |
| 9 | ∞ | 0.300 | 1.51680 | 64.2 | 2.00 |
| 10 | ∞ | 0.537 | 1.51680 | 64.2 | 2.00 |
| 11 | ∞ | (Variable) | | | 2.00 |
| Image Plane | ∞ | | | | |

Aspheric Data

1st Surface

K = −2.33781e+01, A4 = 2.66512e−01, A6 = −2.71827e−01, A8 = 1.63073e−01, A10 = −5.62573e−02, A12 = 8.88364e−03, A14 = −2.73299e−04

4th Surface

K = −2.23840e+00, A4 = 2.57897e+00, A6 = −4.66870e+00, A8 = 3.27975e+01, A10 = −1.09736e+02, A12 = −2.86011e+01, A14 = 2.64759e+02

5th Surface

K = −2.86036e+00, A4 = 7.35985e+00, A6 = −5.46684e+01, A8 = 4.12570e+02, A10 = −1.91827e+03, A12 = 3.99088e+03, A14 = −3.64844e+03

8th Surface

K = −5.78612e+01, A4 = 3.28238e+00, A6 = −4.16190e+01, A8 = 3.46096e+02, A10 = −1.62714e+03, A12 = 3.94066e+03, A14 = −3.81556e+03

| | |
|---|---|
| Focal Length | 0.567 |
| FNo | 2.823 |
| Half Angle of View | 58.975 |
| Image Height | 0.820 |
| Overall Lens Length | 2.660 |
| BF | 0.020 |
| Object Distance (from 1st Surface) | −50.000 |

NUMERICAL EXAMPLE 6

Surface Data:

| Surface No. | r | d | nd | vd | Effective Diameter |
|---|---|---|---|---|---|
| 1* | −0.5414 | 0.048 | 1.62998 | 24.2 | 0.70 |
| 2 | ∞ | 0.100 | 1.51680 | 64.2 | 0.70 |
| 3 | ∞ | 0.010 | 1.51000 | 57.5 | 0.63 |
| 4* | 0.1273 | 0.112 | | | 0.32 |
| 5* | 0.1537 | 0.106 | 1.55000 | 44.0 | 0.30 |
| 6 | ∞ | 0.200 | 1.51680 | 64.2 | 0.70 |
| 7 (Aperture Stop) | ∞ | 0.032 | | | 0.10 |
| 8* | 0.2319 | 0.054 | 1.51000 | 57.5 | 0.28 |
| 9 | ∞ | 0.100 | 1.51680 | 64.2 | 0.70 |
| 10 | ∞ | 0.300 | 1.51680 | 64.2 | 0.70 |
| 11 | ∞ | (Variable) | | | 0.57 |
| Image Plane | ∞ | | | | |

Aspheric Data

1st Surface

K = −8.93872e+05, A4 = 4.44157e+00, A6 = −7.74681e+01, A8 = 1.17271e+03, A10 = −1.06308e+04, A12 = 4.67838e+04, A14 = −7.72015e+04

4th Surface

K = −7.97739e−01, A4 = 1.73658e+01, A6 = 8.74219e+02, A8 = −4.91259e+04, A10 = 4.20029e+06, A12 = −3.25320e+07

5th Surface

K = −3.29982e−01, A4 = −1.83101e+01, A6 = 5.42738e+02, A8 = −5.08804e+04, A10 = 2.66873e+06, A12 = −5.25031e+07

8th Surface

K = −1.71739e+01, A4 = 8.46920e+01, A6 = −6.70464e+03, A8 = 3.61965e+05, A10 = −1.13813e+07, A12 = 1.57506e+08

NUMERICAL EXAMPLE 6

| | |
|---|---|
| Focal Length | 0.241 |
| FNo | 2.860 |
| Half Angle of View | 59.645 |
| Image Height | 0.283 |
| Overall Lens Length | 1.086 |
| BF | 0.024 |
| Object Distance (from 1st Surface) | −10.000 |

NUMERICAL EXAMPLE 7

Surface Data:

| Surface No. | r | d | nd | vd | Effective Diameter |
|---|---|---|---|---|---|
| 1* | ∞ | 0.045 | 1.63000 | 24.0 | 0.63 |
| 2 | ∞ | 0.100 | 1.51000 | 62.7 | 0.63 |
| 3 | ∞ | 0.045 | 1.52290 | 50.3 | 0.48 |
| 4* | 0.0795 | 0.120 | | | 0.23 |
| 5* | 0.1324 | 0.093 | 1.52290 | 50.3 | 0.21 |
| 6 | ∞ | 0.100 | 1.51000 | 62.7 | 0.63 |
| 7 (Aperture Stop) | ∞ | 0.046 | | | 0.11 |
| 8* | 0.2151 | 0.139 | 1.52290 | 50.3 | 0.26 |
| 9 | ∞ | 0.100 | 1.51000 | 62.7 | 0.63 |
| 10 | ∞ | 0.300 | 1.51000 | 62.7 | 0.63 |
| 11 | ∞ | 0.030 | 1.55000 | 43.0 | 0.63 |
| 12 | ∞ | (Variable) | | | 0.63 |
| Image Plane | ∞ | | | | |

Aspheric Data

1st Surface

K = 4.84959e+08, A4 = 2.28540e+01, A6 = −6.91808e+02,
A8 = 1.04838e+04, A10 = −8.41586e+04, A12 = 3.29782e+05,
A14 = −4.71350e+05

4th Surface

K = −2.92031e+00, A4 = 4.37648e+02, A6 = 6.89230e+04,
A8 = −2.53764e+07, A10 = 3.26571e+09, A12 = −1.90625e+11,
A14 = 4.26202e+12

5th Surface

K = −1.42861e+01, A4 = 6.87504e+02, A6 = −1.52757e+05,
A8 = 2.58960e+07, A10 = −2.67593e+09, A12 = 1.50415e+11,
A14 = −3.50170e+12

8th Surface

K = −2.39765e+01, A4 = 1.23379e+02, A6 = −2.07085e+04,
A8 = 2.31612e+06, A10 = −1.50486e+08, A12 = 5.19536e+09,
A14 = −7.40311e+10

| | |
|---|---|
| Focal Length | 0.216 |
| FNo | 3.294 |
| Half Angle of View | 64.578 |
| Image Height | 0.292 |
| Overall Lens Length | 1.119 |
| BF | 0.002 |
| Object Distance (from 1st Surface) | −5.000 |

NUMERICAL EXAMPLE 8

Surface Data:

| Surface No. | r | d | nd | vd | Effective Diameter |
|---|---|---|---|---|---|
| 1* | −0.5863 | 0.039 | 1.52000 | 50.3 | 0.61 |
| 2 | ∞ | 0.100 | 1.51680 | 64.2 | 0.56 |
| 3 | ∞ | 0.045 | 1.52000 | 47.0 | 0.37 |
| 4* | 0.1684 | 0.079 | | | 0.19 |
| 5 | ∞ | 0.000 | 1.59000 | 31.0 | 0.16 |
| 6 | ∞ | 0.000 | 1.51680 | 64.2 | 0.16 |
| 7 | ∞ | 0.100 | 1.51680 | 64.2 | 0.16 |
| 8 (Aperture Stop) | ∞ | 0.066 | 1.52000 | 47.0 | 0.14 |
| 9* | −0.1375 | 0.030 | | | 0.15 |
| 10 | ∞ | 0.000 | 1.51010 | 57.5 | 0.17 |
| 11 | ∞ | 0.100 | 1.51680 | 64.2 | 0.17 |
| 12 | ∞ | 0.053 | 1.52000 | 47.0 | 0.23 |
| 13* | −0.5850 | 0.030 | | | 0.26 |
| 14 | ∞ | 0.500 | 1.51680 | 64.2 | 0.29 |
| 15 | ∞ | (Variable) | | | 0.59 |
| Image Plane | ∞ | | | | |

Aspheric Data

1st Surface

K = 9.33495e−01, A4 = 3.03773e+01, A6 = −4.17311e+02,
A8 = 3.44075e+03, A10 = −9.95257e+03, A12 = −1.09012e+04

4th Surface

K = −9.27285e+01, A4 = 8.66497e+02, A6 = −2.09469e+05,
A8 = 4.43777e+07, A10 = −4.94506e+09, A12 = 2.34507e+11

9th Surface

K = −1.20716e+00, A4 = −5.52866e+01, A6 = 3.58487e+04,
A8 = −1.42433e+07, A10 = 2.31038e+09, A12 = −1.35468e+11

13th Surface

K = −4.10946e+03, A4 = −8.79939e+01, A6 = 1.39199e+04,
A8 = −1.32869e+06, A10 = 6.36096e+07, A12 = −1.18169e+09

| | |
|---|---|
| Focal Length | 0.232 |
| FNo | 2.888 |
| Half Angle of View | 58.990 |
| Image Height | 0.283 |
| Overall Lens Length | 1.166 |
| BF | 0.024 |
| Object Distance (from 1st Surface) | −10.000 |

NUMERICAL EXAMPLE 9

Surface Data:

| Surface No. | r | d | nd | vd | Effective Diameter |
|---|---|---|---|---|---|
| 1* | −3.1789 | 0.066 | 1.63048 | 23.0 | 0.61 |
| 2 | ∞ | 0.100 | 2.10420 | 17.0 | 0.57 |
| 3 | ∞ | 0.045 | 1.52000 | 50.0 | 0.45 |
| 4* | 0.1309 | 0.102 | | | 0.20 |
| 5 | ∞ | 0.000 | 1.59000 | 31.0 | 0.17 |
| 6 | ∞ | 0.000 | 1.51680 | 64.2 | 0.17 |
| 7 | ∞ | 0.100 | 2.10420 | 17.0 | 0.17 |
| 8 (Aperture Stop) | ∞ | 0.109 | 1.52000 | 50.0 | 0.13 |
| 9* | −0.1437 | 0.030 | | | 0.18 |
| 10 | ∞ | 0.000 | 1.51010 | 57.5 | 0.24 |
| 11 | ∞ | 0.100 | 1.51680 | 64.2 | 0.24 |
| 12 | ∞ | 0.065 | 1.52000 | 50.0 | 0.30 |
| 13* | −0.6293 | 0.030 | | | 0.33 |
| 14 | ∞ | 0.500 | 1.51680 | 64.2 | 0.36 |
| 15 | ∞ | (Variable) | | | 0.60 |
| Image Plane | ∞ | | | | |

Aspheric Data

1st Surface

K = −8.95953e+05, A4 = 8.97834e+00, A6 = 6.88544e+01,
A8 = −3.52764e+03, A10 = 4.12939e+04, A12 = −1.68946e+05

4th Surface

K = −3.00090e+01, A4 = 8.93183e+02, A6 = −1.94671e+05,

NUMERICAL EXAMPLE 9 -continued

A8 = 3.87327e+07, A10 = −4.00219e+09, A12 = 1.76454e+11

9th Surface

K = −8.34680e−02, A4 = 1.54201e+01, A6 = 5.18477e+03,
A8 = −7.15389e+05, A10 = 4.99928e+07, A12 = −8.06671e+08

13th Surface

K = −1.09323e+03, A4 = −7.61975e+01, A6 = 7.21542e+03,
A8 = −4.29188e+05, A10 = 1.28397e+07, A12 = −1.49959e+08

| | |
|---|---|
| Focal Length | 0.241 |
| FNo | 2.890 |
| Half Angle of View | 59.000 |
| Image Height | 0.283 |
| Overall Lens Length | 1.271 |
| BF | 0.024 |
| Object Distance (from 1st Surface) | −10.000 |

NUMERICAL EXAMPLE 10

Surface Data:

| Surface No. | r | d | nd | νd | Effective Diameter |
|---|---|---|---|---|---|
| 1* | −0.6586 | 0.086 | 1.51000 | 57.5 | 1.21 |
| 2 | ∞ | 0.200 | 1.51000 | 62.6 | 1.05 |
| 3 | ∞ | 0.100 | 1.51000 | 49.8 | 0.94 |
| 4* | 0.2155 | 0.113 | | | 0.86 |
| 5* | 0.1879 | 0.131 | 1.51000 | 49.8 | 0.61 |
| 6 | ∞ | 0.335 | 1.51000 | 62.6 | 0.61 |
| 7 (Aperture Stop) | ∞ | 0.211 | 1.51000 | 62.6 | 0.24 |
| 8 | ∞ | 0.231 | 1.51000 | 49.8 | 0.39 |
| 9* | −0.2844 | 0.131 | | | 0.50 |
| 10 | ∞ | 0.300 | 1.51000 | 62.6 | 0.63 |
| 11 | ∞ | (Variable) | | | 0.75 |
| Image Plane | ∞ | | | | |

Aspheric Data

1st Surface

K = 0.00000e+00, A4 = 2.17621e+00, A6 = −5.77792e+00,
A8 = 1.03676e+01, A10 = 1.32289e+01, A12 = −8.17297e+01,
A14 = 1.35036e+02

4th Surface

K = −3.65468e+00, A4 = −8.49863e+00, A6 = −2.16459e+01,
A8 = 6.57770e+02, A10 = −3.61640e+03, A12 = 6.94505e+03

5th Surface

K = −1.01029e+00, A4 = −1.73610e+01, A6 = 1.22784e+02,
A8 = −2.89819e+03, A10 = 2.82509e+04, A12 = −7.25800e+04

9th Surface

K = −1.85233e+01, A4 = −5.79919e+01, A6 = 2.92020e+03,
A8 = −9.18811e+04, A10 = 1.75487e+06, A12 = −1.81316e+07,
A14 = 7.68079e+07

| | |
|---|---|
| Focal Length | 0.354 |
| FNo | 2.125 |
| Half Angle of View | 54.989 |
| Image Height | 0.396 |
| Overall Lens Length | 1.917 |
| BF | 0.080 |
| Object Distance | ∞ |

NUMERICAL EXAMPLE 11

Surface Data:

NUMERICAL EXAMPLE 11 -continued

| Surface No. | r | d | nd | νd | Effective Diameter |
|---|---|---|---|---|---|
| 1* | 0.4335 | 0.052 | 1.51000 | 57.5 | 0.68 |
| 2 | ∞ | 0.100 | 1.51633 | 64.1 | 0.63 |
| 3 | ∞ | 0.010 | 1.51000 | 57.5 | 0.53 |
| 4* | 0.0890 | 0.121 | | | 0.44 |
| 5* | 0.2059 | 0.044 | 1.61915 | 24.6 | 0.33 |
| 6 | ∞ | 0.200 | 1.51633 | 64.1 | 0.32 |
| 7 (Aperture Stop) | ∞ | 0.120 | 1.51633 | 64.1 | 0.11 |
| 8 | ∞ | 0.159 | 1.51000 | 57.5 | 0.23 |
| 9* | −0.1654 | 0.005 | | | 0.32 |
| 10 | ∞ | 0.358 | 1.51633 | 64.1 | 0.37 |
| 11 | ∞ | (Variable) | | | 0.56 |
| Image Plane | ∞ | | | | |

Aspheric Data

1st Surface

K = 0.00000e+00, A4 = −2.17175e+01, A6 = −5.22210e−01,
A8 = 3.49034e+03, A10 = −5.00091e+04, A12 = 2.97516e+05,
A14 = −6.53848e+05

4th Surface

K = −1.50748e+00, A4 = −1.05975e+01, A6 = −3.66742e+03,
A8 = 1.22923e+05, A10 = −1.68717e+06, A12 = 9.08010e+06

5th Surface

K = 1.59887e−01, A4 = −3.32148e+01, A6 = −6.68936e+01,
A8 = −1.43281e+05, A10 = 5.57370e+06, A12 = −6.60322e+07

9th Surface

K = −1.04828e+01, A4 = −1.94030e+02, A6 = 1.88341e+04,
A8 = −1.32419e+06, A10 = 6.02564e+07, A12 = −1.52469e+09,
A14 = 1.60764e+10

| | |
|---|---|
| Focal Length | 0.243 |
| FNo | 2.850 |
| Half Angle of View | 55.000 |
| Image Height | 0.293 |
| Overall Lens Length | 1.250 |
| BF | 0.080 |
| Object Distance (from 1st Surface) | −5.000 |

NUMERICAL EXAMPLE 12

Surface Data:

| Surface No. | r | d | nd | νd | Effective Diameter |
|---|---|---|---|---|---|
| 1* | 0.5177 | 0.015 | 1.53681 | 55.5 | 0.93 |
| 2 | ∞ | 0.100 | 1.51633 | 64.1 | 0.89 |
| 3 | ∞ | 0.010 | 1.50833 | 57.6 | 0.82 |
| 4* | 0.1214 | 0.294 | | | 0.71 |
| 5* | 0.2571 | 0.081 | 1.59142 | 29.8 | 0.45 |
| 6 | ∞ | 0.181 | 1.51633 | 64.1 | 0.44 |
| 7 (Aperture Stop) | ∞ | 0.100 | 1.51633 | 64.1 | 0.27 |
| 8 | ∞ | 0.232 | 1.53056 | 56.0 | 0.26 |
| 9* | −0.2239 | 0.005 | | | 0.37 |
| 10 | ∞ | 0.345 | 1.51633 | 64.1 | 0.41 |
| 11 | ∞ | (Variable) | | | 0.58 |
| Image Plane | ∞ | | | | |

Aspheric Data

1st Surface

K = 0.00000e+00, A4 = −2.89474e+01, A6 = 3.68295e+02,
A8 = −2.99080e+03, A10 = 1.43255e+04, A12 = −3.73315e+04,
A14 = 3.98476e+04

4th Surface

-continued

NUMERICAL EXAMPLE 12

K = −9.82168e−01, A4 = −8.09535e+01, A6 = 1.53875e+03,
A8 = −2.17741e+04, A10 = 1.86358e+05, A12 = −8.65130e+05,
A14 = 1.66988e+06
5th Surface K = −1.06516e+00, A4 = −5.98642e+00, A6 = 1.87183e+02,
A8 = −7.67620e+03, A10 = 8.29006e+04, A12 = −3.33045e+05
9th Surface K = −1.79255e+01, A4 = −1.13949e+02, A6 = 8.83608e+03,
A8 = −4.30107e+05, A10 = 1.27960e+07, A12 = −2.00386e+08,
A14 = 1.25234e+09

| | |
|---|---|
| Focal Length | 0.237 |
| FNo | 1.400 |
| Half Angle of View | 54.998 |
| Image Height | 0.293 |
| Overall Lens Length | 1.442 |
| BF | 0.080 |
| Object Distance (from 1st Surface) | −5.000 |

Table 1 summarizes numerical values for inequalities (1), (2), (4) to (7) in each numerical example.

TABLE 1

| | Numerical Example | | | | | |
|---|---|---|---|---|---|---|
| Inequality | 1 | 2 | 3 | 4 | 5 | 6 |
| f1 | −2.709 | −3.006 | −1.536 | −5.710 | −6.099 | −0.859 |
| f2 | −0.173 | −0.186 | −0.182 | −0.227 | −0.581 | −0.250 |
| f3 | 0.228 | 0.270 | 0.245 | 0.354 | 0.581 | 0.279 |
| f4 | 0.400 | 0.401 | 0.431 | 0.386 | 1.532 | 0.455 |
| f | 0.2153 | 0.2157 | 0.2156 | 0.2344 | 0.5673 | 0.2407 |
| d | 0.039 | 0.058 | 0.033 | 0.052 | 0.085 | 0.032 |
| Inequality (1) | 0.224 | 0.227 | 0.254 | 0.269 | 0.210 | 0.543 |
| Inequality (2) | 0.227 | 0.246 | 0.245 | 0.251 | 0.209 | 0.546 |
| Inequality (4) | 0.079 | 0.072 | 0.140 | 0.041 | 0.093 | 0.280 |
| Inequality (5) | −2.318 | −2.158 | −2.372 | −1.698 | −2.637 | −1.821 |
| Inequality (6) | 1.001 | 1.138 | 0.991 | 1.506 | 0.758 | 1.164 |
| Inequality (7) | 0.098 | 0.146 | 0.076 | 0.134 | 0.055 | 0.071 |

| | Numerical Example | | | | | |
|---|---|---|---|---|---|---|
| Inequality | 7 | 8 | 9 | 10 | 11 | 12 |
| f1 | 2E+07 | −1.127 | −5.042 | −1.291 | 0.850 | 0.964 |
| f2 | −0.152 | −0.324 | −0.252 | −0.423 | −0.175 | −0.239 |
| f3 | 0.253 | 0.265 | 0.276 | 0.369 | 0.333 | 0.435 |
| f4 | 0.411 | 1.125 | 1.210 | 0.558 | 0.324 | 0.422 |
| f | 0.2158 | 0.2322 | 0.241 | 0.354 | 0.243 | 0.237 |
| d | 0.046 | 0.249 | 0.305 | 0.211 | 0.120 | 0.100 |
| Inequality (1) | 0.097 | 0.606 | 0.384 | 0.241 | −0.772 | −0.616 |
| Inequality (2) | 0.119 | 0.512 | 0.355 | 0.201 | −0.675 | −0.593 |
| Inequality (4) | 0.000 | 0.206 | 0.048 | 0.274 | 0.286 | 0.246 |
| Inequality (5) | −2.706 | −3.475 | −4.806 | −1.319 | −1.858 | −1.768 |
| Inequality (6) | 0.985 | 0.523 | 0.436 | 1.419 | 1.563 | 1.596 |
| Inequality (7) | 0.112 | 0.221 | 0.252 | 0.379 | 0.371 | 0.236 |

As illustrated in the optical path diagram according to each example, the optical system according to each example uses three or less substrates excluding the sensor cover glass and can be realized at low cost. Despite such a simple configuration, aberrations can be satisfactorily corrected as illustrated in each aberration diagram, and both a wide angle of view and brightness can be achieved as illustrated in each numerical example.

The optical system according to each example is suitable for an imaging optical system for a built-in camera in an electronic apparatus such as a mobile phone, a smartphone, or a wearable terminal, or an objective optical system for an endoscope.

Example 13

Figure 25:
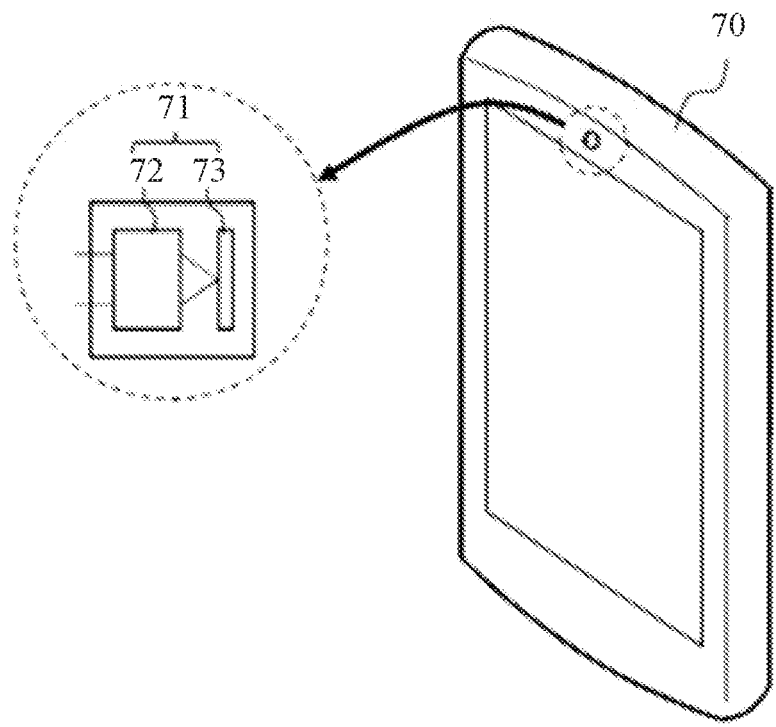
FIG. 25 is a schematic diagram of the principal parts of an electronic apparatus according to Example 13.

Referring now to FIG. 25, a description will be given of an electronic apparatus according to Example 13 of the disclosure. FIG. 25 is a schematic diagram of the principal parts of the electronic apparatus (smartphone 70) according to this example. The smartphone 70 includes an image pickup apparatus 71 as a front camera module. The image pickup apparatus 71 includes an optical system 72 corresponding to the optical system according to any one of Examples 1 to 12 and an image sensor 73 configured to receive an image formed by the optical system 72. Applying the optical system according to each examples described above to the image pickup apparatus such as a smartphone can realize a compact image pickup apparatus having high optical performance.

Example 14

Figure 26:
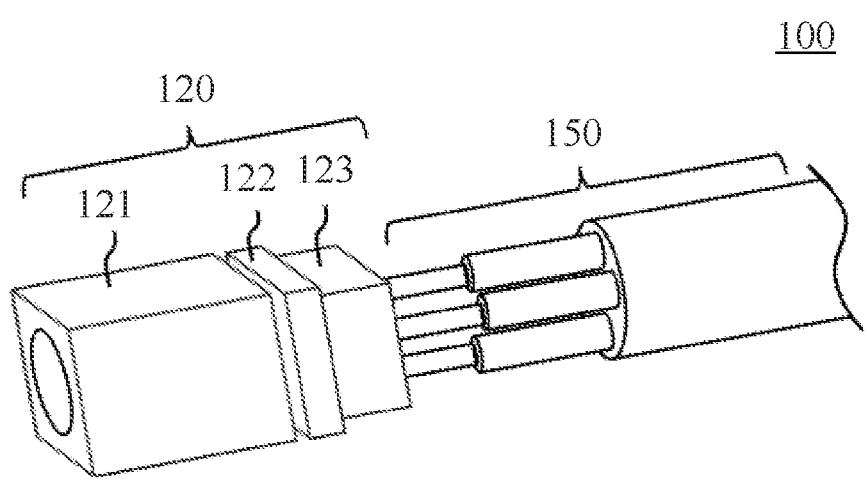
FIG. 26 is a schematic diagram of the principal parts of the image pickup apparatus according to Example 14.

Referring now to FIG. 26, a description will be given of the image pickup apparatus according to Example 14 of the disclosure. FIG. 26 is a schematic diagram of the principal part of the image pickup apparatus 100 according to this example. The image pickup apparatus 100 is used in a miniature endoscope and includes a camera head 120 and an electric cable 150. The camera head 120 includes a lens housing 121 including the optical system according to any one of Examples 1 to 12, an image sensor 122, and a ceramic substrate 123. Wiring of the electric cable 150 is connected to the image sensor 122 through the ceramic substrate 123. Applying the optical system according to each of the above examples to the image pickup apparatus of the endoscope can provide a compact image pickup apparatus with high optical performance.

Each example can provide an optical system and an image pickup apparatus, each of which is compact and has high optical performance.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-013869, filed on Feb. 1, 2022, which is hereby incorporated by reference herein in its entirety.

What is claimed is:
1. An optical system consisting of, in order from an object side to an image side, a first unit, a second unit, and a third unit,
wherein the first unit includes a first substrate, a first lens disposed on the object side of the first substrate, and a second lens having negative power and disposed on the image side of the first substrate,
wherein the second unit includes a second substrate and a third lens having positive power and disposed on the object side of the second substrate, and an aperture stop disposed on the second substrate and closer to the image side than the third lens,
wherein the third unit includes a third substrate and a fourth lens having positive power and disposed on the object side or the image side of the third substrate, and
wherein at least one of the following inequalities are satisfied:

$$-1.000 \leq f \times (1/r9 - 1/r0) \leq 0.700$$

$$-1.000 \le f \times (1/r7 - 1/r0) \le 0.600$$

where r0, r7, and r9 are radii of curvature at positions on an optical axis of the first lens, 70% of an effective radius of the first lens, and 90% of the effective radius of the first lens, respectively, and f is a focal length of the optical system.

2. The optical system according to claim 1, wherein the following inequality is satisfied:

$$0.00 \le |f/f1| \le 0.50$$

where f1 is a focal length of the first lens.

3. The optical system according to claim 1, wherein the following inequality is satisfied:

$$-30 \le vd2 - vd1 \le 70$$

where vd1 is an Abbe number of the first lens based on d-line, and vd2 is an Abbe number of the second lens based on the d-line.

4. The optical system according to claim 1, wherein the following inequality is satisfied:

$$0.030 < d/f4 < 0.390$$

where d is a distance on the optical axis from the aperture stop to a surface on the object side of the fourth lens, and f4 is a focal length of the fourth lens.

5. The optical system according to claim 1, wherein the third lens is disposed on the object side of the second substrate.

6. The optical system according to claim 1, wherein the fourth lens is disposed on the object side of the third substrate.

7. The optical system according to claim 1, wherein the following inequality is satisfied:

$$0.30 < (f3 - f2)/f4 < 1.60$$

where f2 is a focal length of the second lens, f3 is a focal length of the third lens, and f4 is a focal length of the fourth lens.

8. The optical system according to claim 1, wherein the following inequality is satisfied:

$$-5.50 < f4/f2 < -1.00$$

where f2 is a focal length of the second lens, and f4 is a focal length of the fourth lens.

9. The optical system according to claim 1, wherein the first substrate and the first lens have refractive indices different from each other.

10. The optical system according to claim 1, wherein the first substrate and the second lens have refractive indices different from each other.

11. The optical system according to claim 1, wherein the second substrate and the third lens have refractive indices different from each other.

12. The optical system according to claim 1, wherein the third substrate and the third lens have refractive indices different from each other.

13. An image pickup apparatus comprising:
the optical system according to claim 1; and
an image sensor configured to receive an image formed by the optical system.

14. An optical system consisting of, in order from an object side to an image side, a first unit, a second unit, and a third unit,
wherein the first unit includes a first substrate, a first lens disposed on the object side of the first substrate, and a second lens having negative power and disposed on the image side of the first substrate,
wherein the second unit includes a second substrate, a third lens having positive power and disposed on the object side or the image side of the second substrate, and an aperture stop,
wherein the third unit includes a third substrate and a fourth lens having positive power and disposed on the object side or the image side of the third substrate,
wherein at least one of the following inequalities are satisfied:

$$-1.000 \le f \times (1/r9 - 1/r0) \le 0.700$$

$$-1.000 \le f \times (1/r7 - 1/r0) \le 0.600$$

where r0, r7, and r9 are radii of curvature at positions on an optical axis of the first lens, 70% of an effective radius of the first lens, and 90% of the effective radius of the first lens, respectively, and f is a focal length of the optical system, and wherein the following inequality is satisfied:

$$0.030 < d/f4 < 0.390$$

where d is a distance on the optical axis from the aperture stop to a surface on the object side of the fourth lens, and f4 is a focal length of the fourth lens.

15. An image pickup apparatus comprising:
the optical system according to claim 14; and
an image sensor configured to receive an image formed by the optical system.

* * * * *